(12) United States Patent  
Kazama

(10) Patent No.: US 7,023,688 B2  
(45) Date of Patent: Apr. 4, 2006

(54) LAMINATED CERAMIC CAPACITOR, MOUNTED STRUCTURE OF LAMINATED CERAMIC CAPACITOR, AND CAPACITOR MODULE

(75) Inventor: Satoshi Kazama, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 228 days.

(21) Appl. No.: 10/826,369

(22) Filed: Apr. 19, 2004

(65) Prior Publication Data

US 2004/0207972 A1 Oct. 21, 2004

(30) Foreign Application Priority Data

Apr. 16, 2003 (JP) ........................ 2003-111962  
Mar. 19, 2004 (JP) ........................ 2004-081408

(51) Int. Cl.  
*H01G 4/06* (2006.01)

(52) U.S. Cl. .................. 361/321.1; 361/321.2; 361/321.5; 361/306.1; 361/306.3; 361/311; 361/313

(58) Field of Classification Search .............. 361/321.1, 361/321.2, 321.5, 303, 306.1, 306.3, 311, 361/313, 301.1, 301.4, 308.1, 310, 328, 330  
See application file for complete search history.

(56) References Cited

U.S. PATENT DOCUMENTS 4,590,537 A    5/1986  Sakamoto  
6,134,098 A *  10/2000 Kuroda et al. ........... 361/321.2  
6,362,947 B1 * 3/2002  Chazono .................. 361/306.3  
6,407,907 B1 * 6/2002  Ahiko et al. ............. 361/306.3  
6,549,395 B1 * 4/2003  Naito et al. .............. 361/306.1  
6,724,611 B1 * 4/2004  Mosley .................... 361/306.3  
6,795,295 B1 * 9/2004  Murakami et al. ....... 361/306.3

FOREIGN PATENT DOCUMENTS

JP          11-288838         10/1999

* cited by examiner

*Primary Examiner*—Dean A. Reichard  
*Assistant Examiner*—Nguyen T. Ha  
(74) *Attorney, Agent, or Firm*—Lowe, Hauptman & Berner, LLP

(57) ABSTRACT

In this laminated ceramic capacitor, a heat radiation conductor is provided on a top face of a rectangular parallelepiped laminated chip where a plurality of first conductor layers and a plurality of second conductor layers are arranged alternatively through each ceramic layer with facing each other. In addition, the heat radiation conductor is connected to the upper edge of each second conductor layer. Therefore, when heat is generated in each first conductor layer and each second conductor layer which play the role of internal electrodes, the heat of each second conductor layer is directly transferred from each second conductor layer to the heat radiation conductor, and is radiated outside from the heat radiation conductor.

27 Claims, 26 Drawing Sheets

LAMINATED CERAMIC CAPACITOR, MOUNTED STRUCTURE OF LAMINATED CERAMIC CAPACITOR, AND CAPACITOR MODULE

BACKGROUND OF THE INVENTION (i) Field of the Invention

The present invention relates to a laminated ceramic capacitor comprising a plurality of conductor layers (internal electrodes), which face each other, in a laminated chip, a mounted structure of a laminated ceramic capacitor which is constituted by mounting a laminated ceramic capacitor on a substrate, and a capacitor module which is constituted by providing a plurality of laminated ceramic capacitors on a conductive plate.

(ii) Description of the Related Art

FIGS. 1 to 3 show a conventional laminated ceramic capacitor disclosed in Japanese Patent Laid-Open No. H11-288838.

FIG. 1 is a perspective view of the laminated ceramic capacitor, FIG. 2 is a sectional view taken on line a1—a1 in FIG. 1, and FIG. 3 is a sectional view taken on line a2—a2 in FIG. 1.

This laminated ceramic capacitor is arranged so that a plurality of internal electrodes 1 may face each other through ceramic layers 2 in a ceramic device having a rectangular parallelepiped shape. As for a plurality of internal electrodes 1, each plane shape is a rectangle and each edge of the respective internal electrodes 1 in the longitudinal direction is drawn out by turns to one face 3a and another face 3b in the longitudinal direction of the ceramic device. The edges of some internal electrodes 1 drawn out to the face 3a are connected to one external electrode 4a, and the edges of the remaining internal electrodes 1 drawn out to the face 3b are connected to another external electrode 4b.

In addition, a plurality of internal electrodes 5 for heat radiation are arranged in each ceramic layer 2 between the adjacent internal electrodes 1 without contacting to the internal electrodes 1. As for the internal electrodes 5 for heat radiation, each plane shape is cross-shaped and each edge of the respective internal electrodes 5 for heat radiation in the width direction is drawn out by turns to one face 6a and another face 6b in the width direction of the ceramic device. The edges of all internal electrodes 5 for heat radiation drawn out to the face 6a are connected to one external electrode 7a for heat radiation, and the edges of all the remaining internal electrodes 5 for heat radiation drawn out to the face 6b are connected to another external electrode 7b for heat radiation.

In this laminated ceramic capacitor, each internal electrode 5 for heat radiation is arranged between each pair of internal electrodes 1 in the ceramic device without contacting. Then, by connecting the plurality of these internal electrodes 5 for heat radiation to the external electrodes 7a and 7b for heat radiation, heat of the capacitor itself is radiated outside by using the internal electrodes 5 for heat radiation and the external electrodes 7a and 7b for heat radiation.

By the way, the temperature rise of the laminated ceramic capacitor mainly depends on the heat generated in the internal electrodes 1 at the time of voltage application, and the heat transferred from a mount substrate to the internal electrodes 1 and the like through the external electrodes 4a and 4b.

In the above-mentioned laminated ceramic capacitor, it is made to radiate heat by using each internal electrode 5 for heat radiation arranged between each pair of internal electrodes in the ceramic device without contacting, and the external electrodes 7a and 7b for heat radiation connected to the plurality of these internal electrodes 5 for heat radiation. Nevertheless, since each ceramic layer 2 exists between each pair of one internal electrode 1 and one electrode 5 for heat radiation, these ceramic layers 2 interfere heat transfer from the internal electrodes 1 to the internal electrodes 5 for heat radiation.

That is, since the ceramic layers 2 are insulation materials which are far inferior to conductors such as the internal electrodes 1 in heat transfer property, it is difficult to efficiently transfer the heat of the internal electrodes 1 to the internal electrode 5 for heat radiation. Hence, as a result, since it is not possible to perform expected heat radiation, it is difficult to control the temperature rise of the laminated ceramic capacitor.

SUMMARY OF THE INVENTION

The present invention is created in view of the above-mentioned circumstances, and objects of the present invention is to provide a laminated ceramic capacitor, a mounted structure of the laminated ceramic capacitor, and a capacitor module which are excellent in heat radiation capability.

In order to achieve the above-described objects, the laminated ceramic capacitor according to the present invention comprises, a rectangular parallelepiped laminated chip having a plurality of first conductor layers and a plurality of second conductor layers, the first conductor layers and the second conductor layers being alternately arranged to face each other through a ceramic layer; at least one first electrode which is provided on one face of the laminated chip and conducts with the first conductor layers; at least one second electrode which is provided in the one face of the laminated chip without contacting with the first electrode, and conducts with the second conductor layers; and at least one heat radiation conductor which is provided on at least one face different from the one face of the laminated chip, and conducts with at least one of the first conductor layers and the second conductor layers.

In addition, the mounted structure according to the present invention comprises, at least one laminated ceramic capacitor mounted on a substrate so that a first electrode of the laminated ceramic capacitor is connected to a first land on a mounting surface of the substrate and a second electrode of the laminated ceramic capacitor is connected to a second land on the mounting surface of the substrate, wherein the laminated capacitor includes, a rectangular parallelepiped laminated chip having a plurality of first conductor layers and a plurality of second conductor layers, the first conductor layers and the second conductor layers being alternately arranged to face each other through a ceramic layer; at least one first electrode which is provided on one face of the laminated chip and conducts with the first conductor layers; at least one second electrode which is provided in the one face of the laminated chip without contacting with the first electrode, and conducts with the second conductor layers; and at least one heat radiation conductor which is provided on at least one face different from the one face of the laminated chip, and conducts with at least one of the first conductor layers and the second conductor layers.

According to the above-mentioned laminated ceramic capacitor, and mounted structure, when heat is generated in each conductor layer at the time of voltage application to the lamination ceramic capacitor after mounting, or, when heat from a mount substrate is transferred to each conductor layer through each electrode, this heat is directly transferred from at least one of the first conductor layers and second conductor layers to the heat radiation conductor, and is radiated outside from the heat radiation conductor. In short, it is possible to control temperature rise by radiating the heat of the capacitor itself outside effectively by transferring the heat of at least one of the first conductor layers and second conductor layers to the heat radiation conductor directly and efficiently.

On the other hand, a capacitor module according to the present invention comprises, a conductive plate with a predetermined shape; and a plurality of laminated ceramic capacitors including, a rectangular parallelepiped laminated chip having a plurality of first conductor layers and a plurality of second conductor layers, the first conductor layers and the second conductor layers being alternately arranged to face each other through a ceramic layer; at least one first electrode which is provided on one face of the laminated chip and conducts with the first conductor layers; at least one second electrode which is provided in the one face of the laminated chip without contacting with the first electrode, and conducts with the second conductor layers; and at least one heat radiation conductor which is provided on at least one face different from the one face of the laminated chip, and conducts with at least one of the first conductor layers and the second conductor layers, wherein the capacitor module is constituted by providing each laminated ceramic capacitor on the conductive plate in predetermined arrangement so that a face different from the one face of each laminated chip faces the conductive plate, and at least one of the first conductor layers and second conductor layers conduct with the conductive plate.

In the above-mentioned capacitor module, it is possible to mount a plurality of laminated ceramic capacitors on the substrate in a lump by using the conductive plate. In addition, when heat is generated in each conductor layer at the time of voltage application to the lamination ceramic capacitor after mounting, or, when heat from a mount substrate is transferred to each conductor layer through each electrode, this heat is directly transferred from at least one of the first conductor layers and second conductor layers to a conductive plate, and is radiated outside from the conductive plate. In short, it is possible to control temperature rise by radiating the heat of the capacitor itself outside effectively by transferring the heat of at least one of the first conductor layers and second conductor layers to the conductive plate directly and efficiently.

The above-mentioned objects, other objects, features, and benefits of the present invention will become clear by the following description and accompanying drawings.

DESCRIPTION OF THE PREFERRED EMBODIMENTS

Hereafter, with reference to drawings, embodiments of a laminated ceramic capacitor, a mounting structure of the laminated ceramic capacitor, and a capacitor module according to the present invention will be explained.

FIGS. 4 to 7 show a first embodiment of the laminated ceramic capacitor.

Figure 4A:
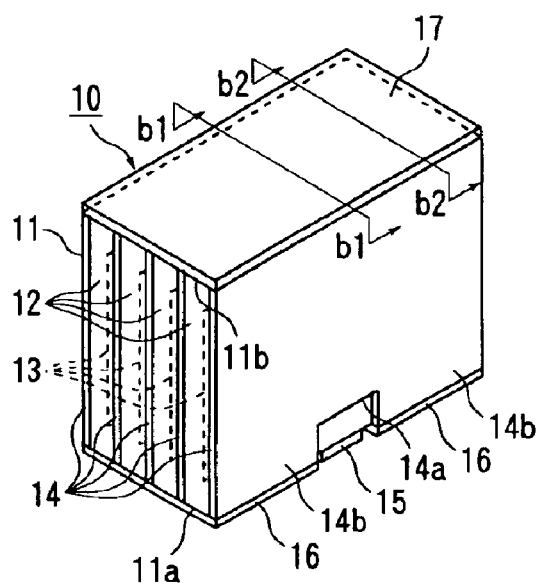
FIG. 4A is a perspective view in view of a top face side of a laminated ceramic capacitor which shows a first embodiment of the laminated ceramic capacitor.
Figure 4B:
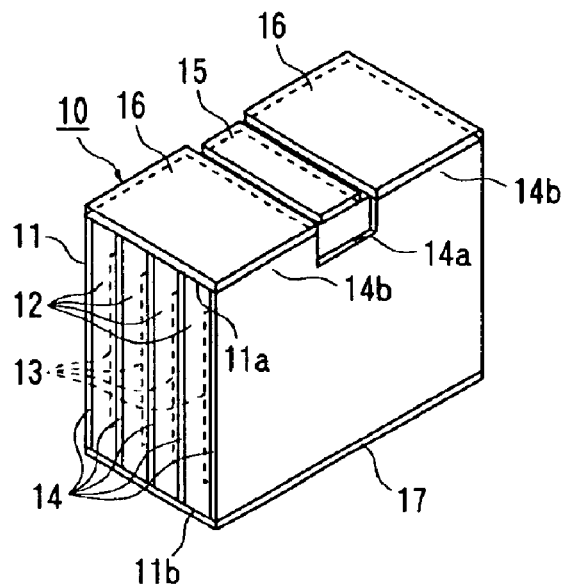
FIG. 4B is a perspective view in view of the bottom face side of the laminated ceramic capacitor shown in FIG. 4A.
Figure 5A:
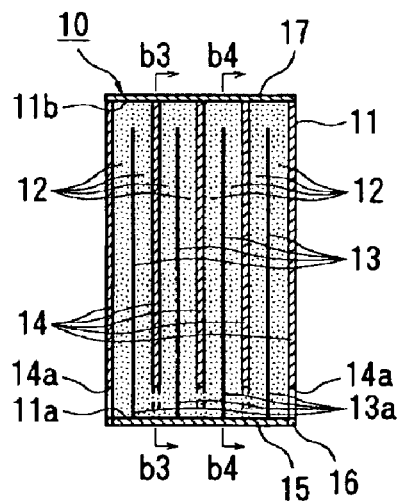
FIG. 5A is a sectional view taken on line b1—b1 in FIG. 4A.
Figure 5B:
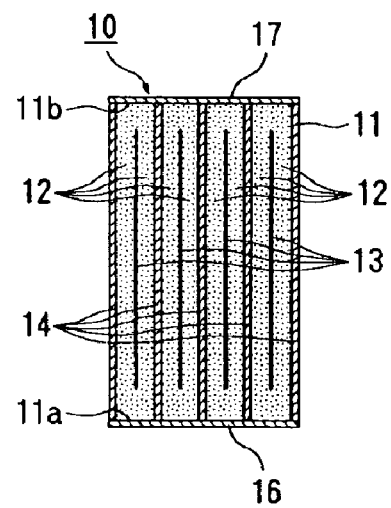
FIG. 5B is a sectional view taken on line b2—b2 in FIG. 4A.
Figure 6A:
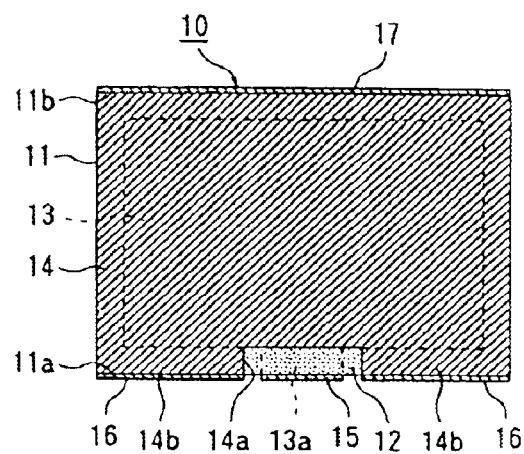
FIG. 6A is a sectional view taken on line b3—b3 in FIG. 5A.
Figure 6B:
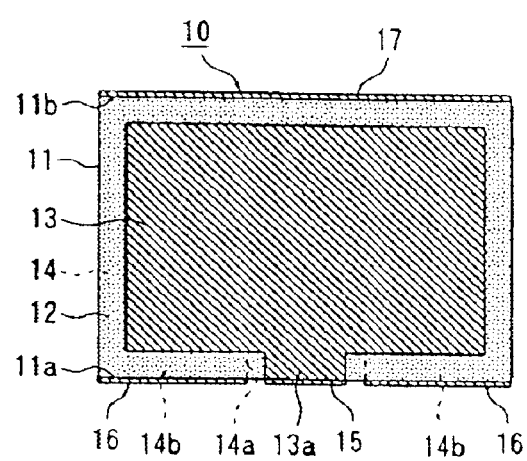
FIG. 6B is a sectional view taken on line b4—b4 in FIG. 5A.
Figure 7A:
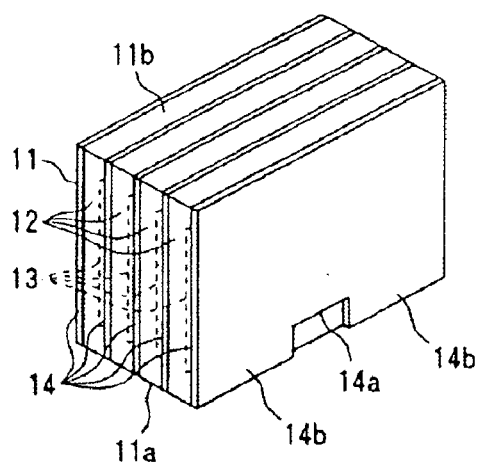
FIG. 7A is a diagram where the first electrode, second electrode, and heat radiation conductor are removed from FIG. 4A.
Figure 7B:
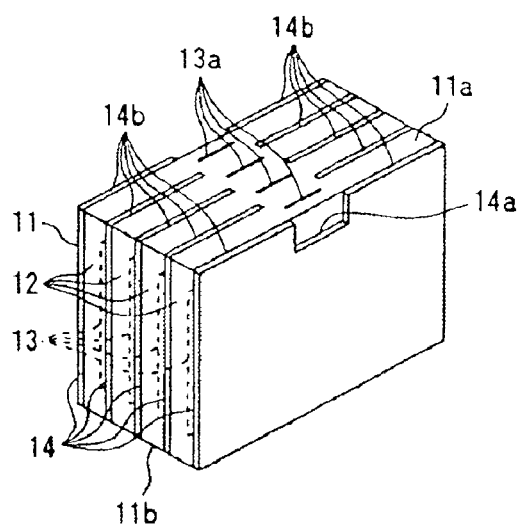
FIG. 7B is a diagram where the first electrode, second electrode, and heat radiation conductor are removed from FIG. 4B.

Incidentally, FIG. 4A is a perspective view in view of the top face side of the laminated ceramic capacitor, and FIG. 4B is a perspective view in view of the bottom face side of the laminated ceramic capacitor. FIG. 5A is a sectional view taken on line b1—b1 in FIG. 4A, and FIG. 5B is a sectional view taken on line b2—b2 in FIG. 4A. FIG. 6A is a sectional view taken on line b3—b3 in FIG. 5A, and FIG. 6B is a sectional view taken on line b4—b4 in FIG. 5A. FIG. 7A is a diagram where the first electrode, second electrode, and heat radiation conductor are removed from FIG. 4A, and FIG. 7B is a diagram where the first electrode, second electrode, and heat radiation conductor are removed from FIG. 4B.

This laminated ceramic capacitor 10 comprises a laminated chip 11 with a rectangular parallelepiped shape. This laminated chip 11 has the structure that a plurality of first conductor layers 13 (four in the figure), and a plurality of second conductor layers 14 (five in the figure) are arranged so as to alternate through each ceramic layer 12 and to face each other in a crosswise direction.

Each first conductor layer 13 is a rectangle one-size smaller than each second conductor layer 14, and has a lead section 13a in predetermined width in the center of its lower edge. An end of each lead section 13a is exposed on a bottom face 11a of the laminated chip 11. So long as this lead section 13a is connectable to a below-mentioned first electrode 15, there is no special limitation in its shape and formed position. In addition, an upper edge of each first conductor layer 13 is in an inside position apart from a top face 11b of the laminated chip 11. Furthermore, both side edges of each first conductor layer 13 are in inside positions apart from two side faces in the direction orthogonal to the laminated direction of conductor layers of the laminated chip 11.

Each second conductor layer 14 is the almost same rectangle as a side face of the laminated direction of conductor layers of the laminated chip 11. In addition, each second conductor layer 14 has depth being the almost same as the vertical length of the lead section 13a in the center of its lower edge, and has a notch section 14a with width large than that of the lead section 13a to have a total of two lead sections 14b with predetermined width on its both sides. An end of each lead section 14b is exposed on the bottom face 11a of the laminated chip 11 without contacting with the edge of each lead section 13a. So long as this lead section 14b is connectable to a below-mentioned second electrode 16, there is no special limitation in its shape and formed position. In addition, an upper edge of each second conductor layer 14 is exposed on the top face 11b of the laminated chip 11. Furthermore, both side edges of each second conductor layer 14 are exposed on two inside faces in the direction orthogonal to the laminated direction of conductor layers of the laminated chip 11. Furthermore, the second conductor layers 14 are located in two side faces in the laminated direction of conductor layers of the laminated chip 11, respectively.

On the bottom face 11a of the laminated chip 11, the first electrodes 15 connected to the edges of the lead sections 13a of respective first conductor layers 13 exposed on this bottom face 11a are formed zonally in the laminated direction of conductor layers of the laminated chip 11 in the width almost equal to the exposed width of the lead sections 13a.

In addition, on the bottom face 11a of the laminated chip 11, two of the second electrodes 16 connected to the edges of the lead sections 14a of respective second conductor layers 14 exposed on this bottom face 11a are formed zonally in the laminated direction of conductor layers of the laminated chip 11 in the width almost equal to the exposed width of the lead sections 14a without contacting with the first electrodes 15.

Furthermore, in the top face 11b of the laminated chip 11, a heat radiation conductor 17 connected to the upper edge of each second conductor layer 14 exposed on this top face 11b is formed so as to cover the entire top face 11b. As apparent from the below-mentioned process explanation, this heat radiation conductor 17 is made of a conductive film.

In the above-mentioned laminated ceramic capacitor 10, the edge of the lead section 13a of each first conductor layer 13 connects to one first electrode 15 provided on the bottom face 11a of the laminated chip 11, and the edge of the lead section 14a of each second conductor layer 14 connects to two second electrodes 16 provided on the bottom face 11a of the laminated chip 11. Since the upper edge of each second conductor layer 14 is connected to the heat radiation conductor 17 provided on the top face 11b of the laminated chip 11, it is possible to obtain predetermined electrostatic capacity between the first electrodes 15 and the second electrodes 16 which are provided on the bottom face 11a of the laminated chip 11.

Figure 1:
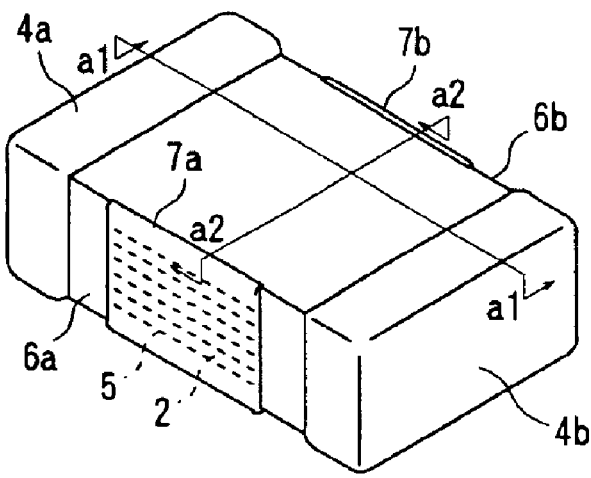
FIG. 1 is a perspective view of a conventional laminated ceramic capacitor.
Figure 2:
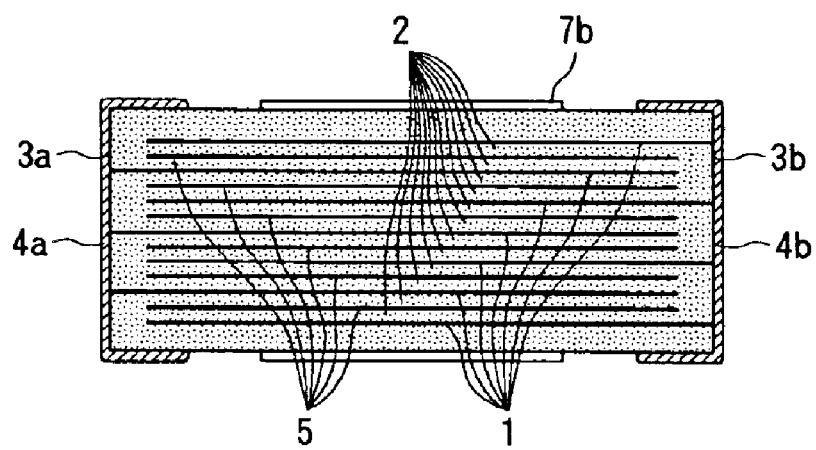
FIG. 2 is a sectional view taken on line a1—a1 in FIG. 1.
Figure 3:
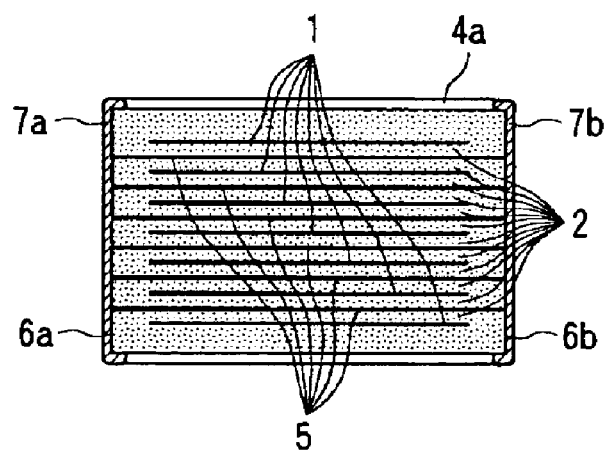
FIG. 3 is a sectional view taken on line a2—a2 in FIG. 1.

In other words, since there is no unnecessary conductor layer between the respective first conductor layers 13 and respective second conductor layers 14 which are adjacent, that is, there are no internal electrodes 5 for heat radiation, different from the internal electrodes 1, between the adjacent internal electrodes 1 respectively like the conventional laminated ceramic capacitors shown in FIGS. 1 to 3. Hence, it is possible to stably secure expected electrostatic capacity between the first electrode 15 and second electrodes 16 which are provided on the bottom face 11a of the laminated chip 11.

In addition, only the first conductor layers 13 and second conductor layers 14 which play the role of internal electrodes are provided in the laminated chip 11. Hence, it is easily realizable to achieve the large capacity and miniaturization of the laminated ceramic capacitor 10 in comparison with providing the internal electrodes 5, which are dedicated for heat radiation and are separate from the internal electrodes 1, in a ceramic device like the conventional laminated ceramic capacitors shown in FIGS. 1 to 3. That is, when dimensions of the laminated chip 11 are the same as those of a conventional ceramic device, it is possible to increase electrostatic capacity by increasing the number of the first conductor layers 13 and second conductor layers 14. In addition, when they have the same capacity, it is possible to make the dimensions of the laminated chip 11 smaller than those of the conventional ceramic device.

Here, an example of a production method of the above-mentioned laminated ceramic capacitor 10 will be explained with citing FIGS. 8 to 12.

Figure 8:
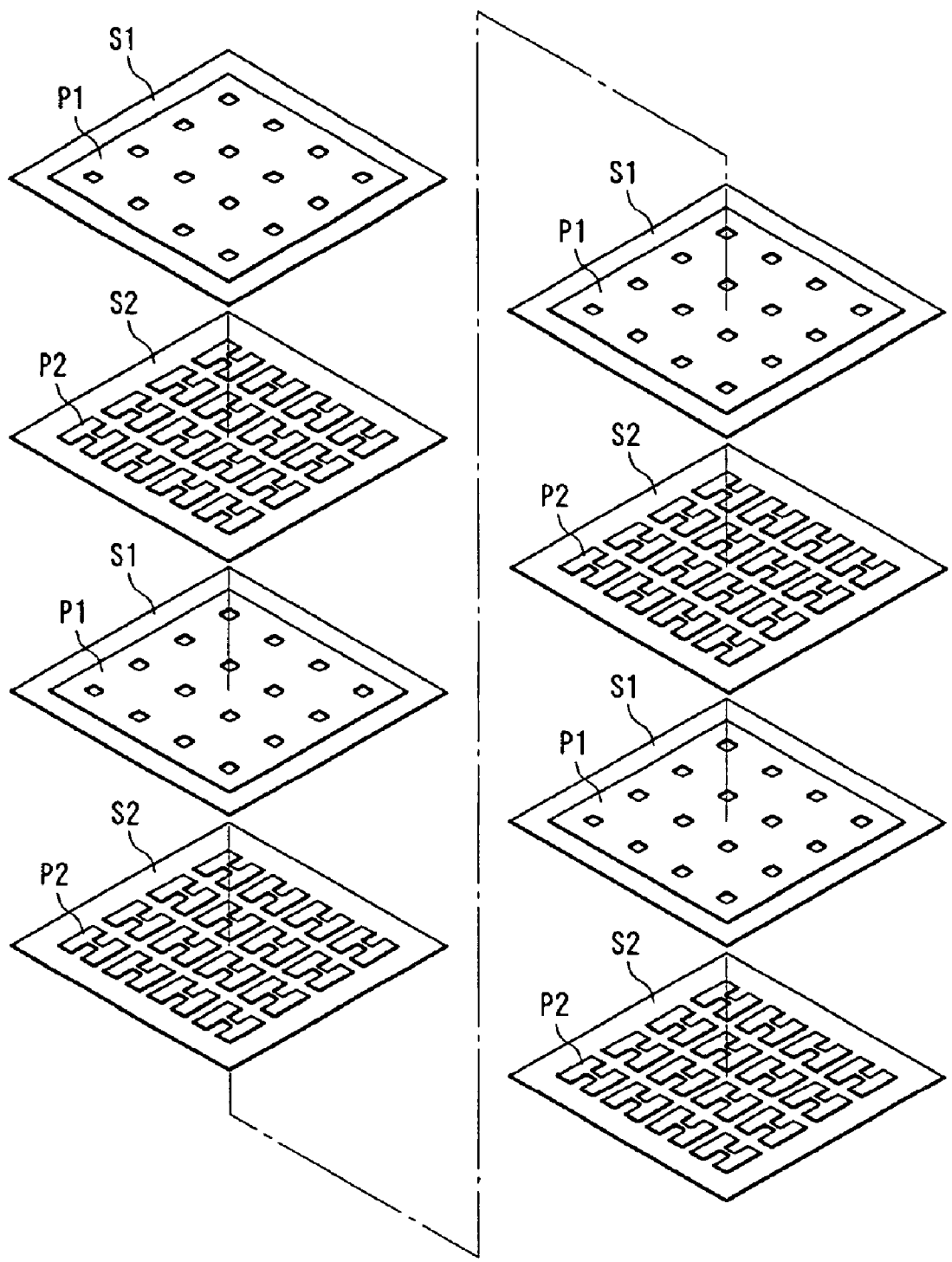
FIGS. 8 to 12 are explanatory diagrams of a production method of the laminated ceramic capacitor shown in FIG. 4A.

On the occasion of production, sheets S1 and S2 shown in FIG. 8 are prepared first. The sheet S1 is produced by printing and drying conductive paste, containing metal powder such as silver and nickel, on a green sheet obtained by coating and drying ceramic slurry, containing dielectric powder such as barium titanate, in predetermined thickness, by using a screen etc., and forming a conductor pattern P1 for the second conductor layers 14. In addition, the sheet S2 is produced by printing and drying conductive paste, containing metal powder such as silver and nickel, on a green sheet obtained by coating and drying ceramic slurry, containing dielectric powder such as barium titanate, in predetermined thickness, by using a screen etc., and forming a conductor pattern P2 for the first conductor layers 13.

Incidentally, although 32-piece sheets S1 and S2 are shown in the figure for the convenience of drawing, the piece count of actual sheets is larger than this.

Figure 9:
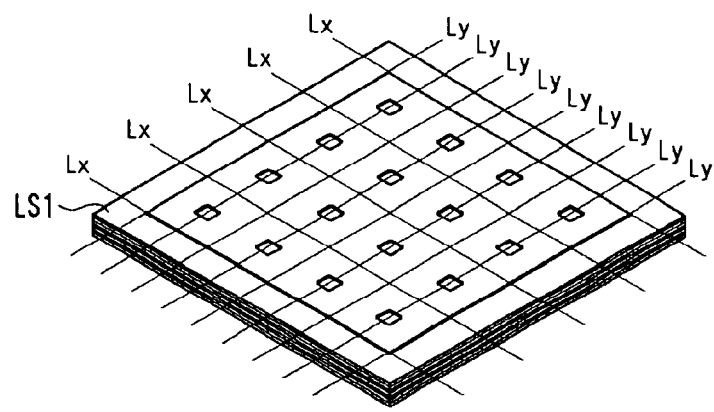

Then, the above-mentioned sheets S1 and S2 are laminated and stuck by pressure in the order shown in FIG. 8, and a laminated sheet LS1 shown in FIG. 9 is obtained.

Figure 10:
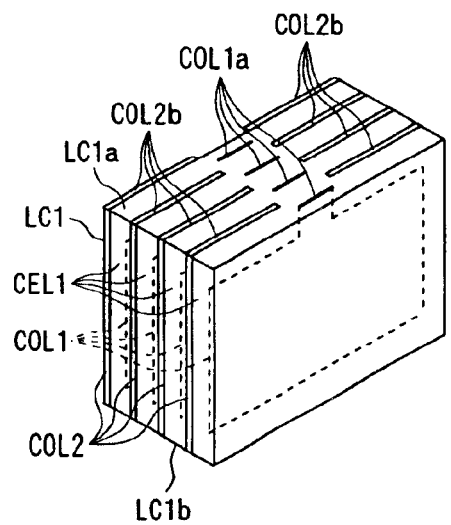

Subsequently, the lamination sheet LS1 is cut along line LX–Ly shown in FIG. 9, and a laminated chip LC1 shown in FIG. 10 is obtained.

This laminated chip LC1 has the structure that four unbaked conductor layers COL1 for the first conductor layers 13, and four unbaked conductor layers COL2 for the second conductor layers 14 are arranged so as to alternate through unbaked ceramic layers CEL1 and to face each other in a crosswise direction. An end of a lead section COL1a of each unbaked conductor layer COL1 is exposed on a bottom face LC1a of the laminated chip LC1. In addition, an end of a lead section COL2a of each unbaked conductor layer COL2 is exposed on the bottom face LC1a of the laminated chip LC1. Furthermore, an upper edge of each unbaked conductor layer COL2 is exposed on a top face LC1b of the laminated chip LC1.

Figure 11:
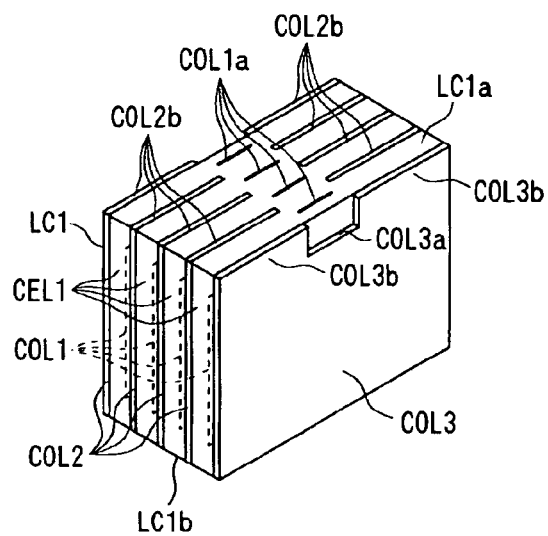

Then, as shown in FIG. 11, an unbaked conductor layer COL3 for a remaining one of the second conductor layers 14 is formed by coating and drying conductive paste, being the same as the above-described one, on a side face (side face where the unbaked ceramic layer exposes) in the laminated direction of conductor layers of the above-mentioned laminated chip LC1 in the same shape as that of the unbaked conductor layer COL2. This unbaked conductor layer COL3 is the same shape as that of the unbaked conductor layer COL2, and has a notch section COL3a in the center of its lower edge to have a lead section COL3b in both sides thereof.

Figure 12:
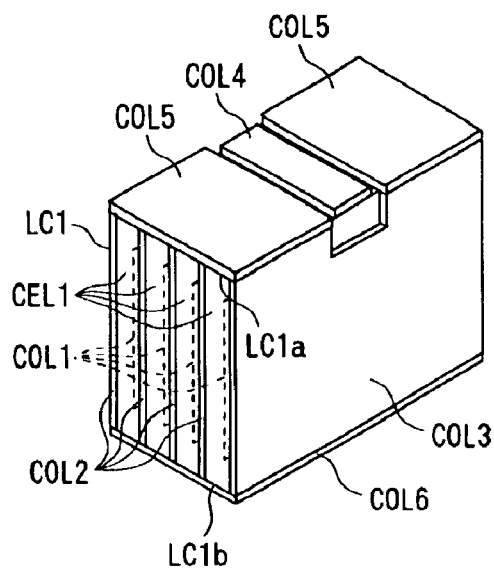

Subsequently, as shown in FIG. 12, an unbaked electrode COL4 for the first electrode 15 is formed by zonally coating and drying the conductive paste, being the same as the above-described one, in the center of the bottom face of the above-mentioned laminated chip LC1. At the same time, an unbaked electrode COL5 for the second electrode 16 is formed by zonally coating and drying the conductive paste, being the same as the above-described one, in both sides of the bottom face of the above-mentioned laminated chip LC1. Furthermore, an unbaked conductor COL6 for the heat radiation conductor 17 is formed by coating and drying the conductive paste, being the same as the above-described one, in the entire top face of the laminated chip LC1.

Then, many laminated chips LC1 shown in FIG. 12 are baked in a lump. In this manner, the laminated ceramic capacitor 10 is produced.

In the above-mentioned production method, the unbaked conductor layer COL3 for a remaining one of the second conductor layers 14, the unbaked electrode COL4 for the first electrode 15, the unbaked electrode COL5 for the second electrode 16, and the unbaked conductor COL6 for the heat radiation conductor 17 are formed on the laminated chip LC1 shown in FIG. 10, and these are simultaneously baked with the laminated chip LC1. Nevertheless, it is also acceptable to bake only the laminated chip LC1 shown in the FIG. 10, to sequentially form the unbaked conductor layer COL3, unbaked electrode COL4, unbaked electrode COL5, and the unbaked conductor COL6 on the laminated chip LC1 after baking, and to perform baking treatment.

In addition, in the above-mentioned production method, the remaining one of the second conductor layers 14, first electrode 15, second electrode 16, and heat radiation conductor 17 are formed by a thick film forming method by paste coating and baking. Nevertheless, it is also acceptable to form at least one of these by a thin film forming method such as electrolytic plating or sputtering.

Figure 13:
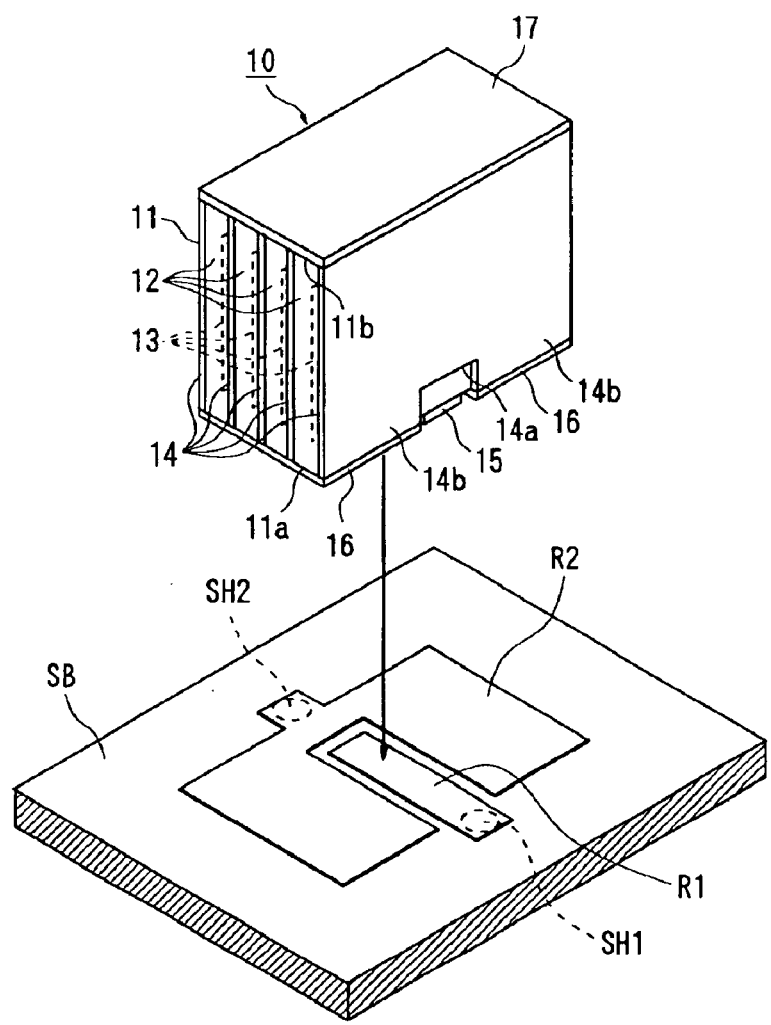
FIG. 13 is an explanatory diagram of a mounting method of the laminated ceramic capacitor shown in FIG. 4A.

The above-mentioned laminated ceramic capacitor 10, as shown in FIG. 13, can be mounted so that the bottom face 11a of the laminated chip 11 may face the mounting surface of the substrate on a substrate SB having lands R1 and R2 respectively corresponding to the first electrode 15 and second electrodes 16, one piece of first electrode 15 may connects to a land R1, and two pieces of second electrodes 16 may connect to a land R2.

Incidentally, in the substrate SB shown in FIG. 13, one of the lands R1 and R2 is a positive electrode, and another one becomes a ground electrode. The wiring to the land R1 is routed through a through hole SH1 to the back side of the substrate, and the wiring of the land R2 used as another side is routed through the through hole SH2 in the back side of the substrate.

In the above-mentioned laminated ceramic capacitor 10 and an assembly where the above-mentioned laminated ceramic capacitor 10 is mounted on the substrate SB (mounted structure), when heat is generated in each first conductor layer 13 and each second conductor layer 14 at the time of voltage application to the laminated ceramic capacitor 10 after mounting, and when the heat of a heat-generating device such as CPU, mounted on the mount substrate SB, is transferred to each first conductor layer 13 and each second conductor layer 14 from the substrate SB and lands R1 and R2 through the first electrode 15 and second electrodes 16, the heat of each second conductor layer 14 is directly transferred from each second conductor layer 14 to the heat radiation conductor 17, and is radiated outside from the heat radiation conductor 17. In addition, the heat of each first conductor layer 13 is transferred to the heat radiation conductor 17 indirectly through the ceramic layers 12 and second conductor layers 14, and is radiated similarly. That is, it is possible to control temperature rise by radiating the heat of the capacitor itself outside effectively by transferring the heat of the respective second conductor layers 14 of the respective first conductor layers 13 and respective second conductor layers 14 to the heat radiation conductor 17 directly and efficiently.

In addition, since the heat radiation conductor 17 is provided so as to cover the entire top face of the laminated chip 11, it is possible to perform the above-mentioned heat radiation more effectively by securing an area for radiating heat outside.

Furthermore, the second conductor layers 14 are exposed on two side faces in the laminated direction of conductor layers of the laminated chip 11 respectively. Moreover, both side edges of each second conductor layer 14 expose on two side faces of the direction orthogonal to the laminated direction of conductor layers of the laminated chip 11. Hence, it is possible to promote the above-mentioned heat radiating action by making these exposed portions act the same operation as that of the heat radiation conductor.

Figure 14A:
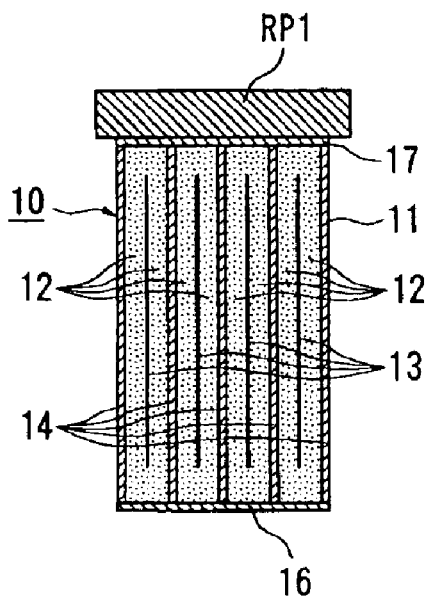
FIG. 14A is a vertical sectional view showing a modified example of the heat radiation conductor.

In addition, the above-mentioned laminated ceramic capacitor 10 comprises the heat radiation conductor 17 made of the conductive film. Nevertheless, as shown in FIG. 14A, it is also good to make a conductive plate (heat sink) RP1, which is made of high heat conductivity metal such as aluminum and is connected to the conductive film (17), a heat radiation conductor.

Figure 14B:
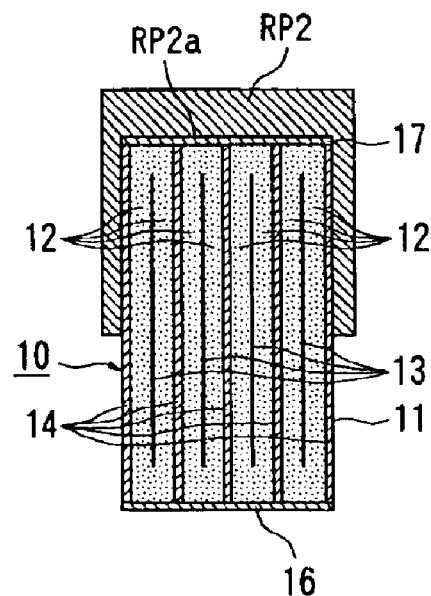
FIG. 14B is a vertical sectional view showing another modified example of the heat radiation conductor.
Figure 14C:
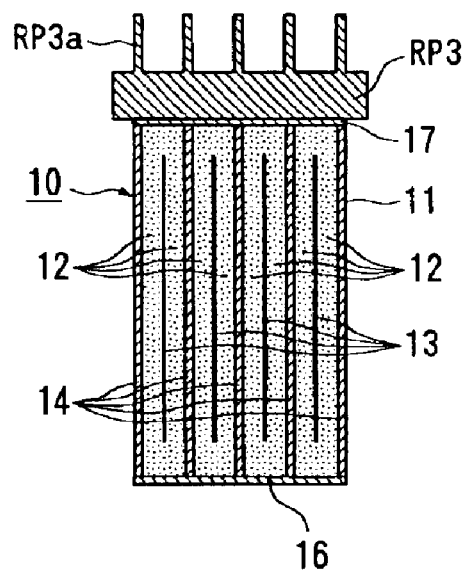
FIG. 14C is a vertical sectional view showing still another modified example of the heat radiation conductor.
Figure 14D:
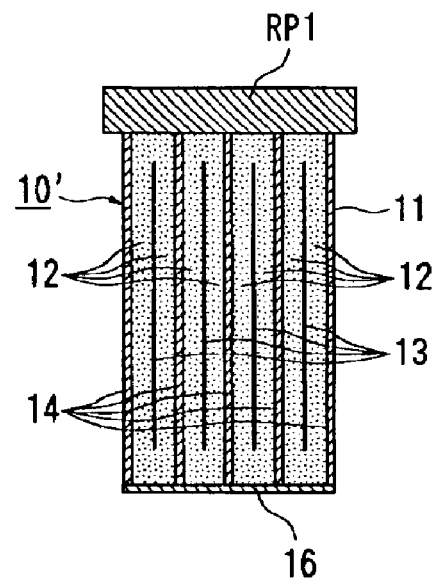
FIG. 14D is a vertical sectional view showing a further modified example of the heat radiation conductor.

It is also possible to use as this conductive plate an object (RP2) having a concavity RP2a which accepts a part of the laminated chip 11 as shown in FIG. 14B, and an object (RP3) having a plurality of fins RP3a as shown in FIG. 14C besides a plate-like object. In addition, when providing the conductive plate RP1 so as to be connected to the upper edge of each second conductor layer 14 as shown in FIG. 14D, it is also possible to make the structure (10') that the above-mentioned conductive film (17) is eliminated.

Figure 15:
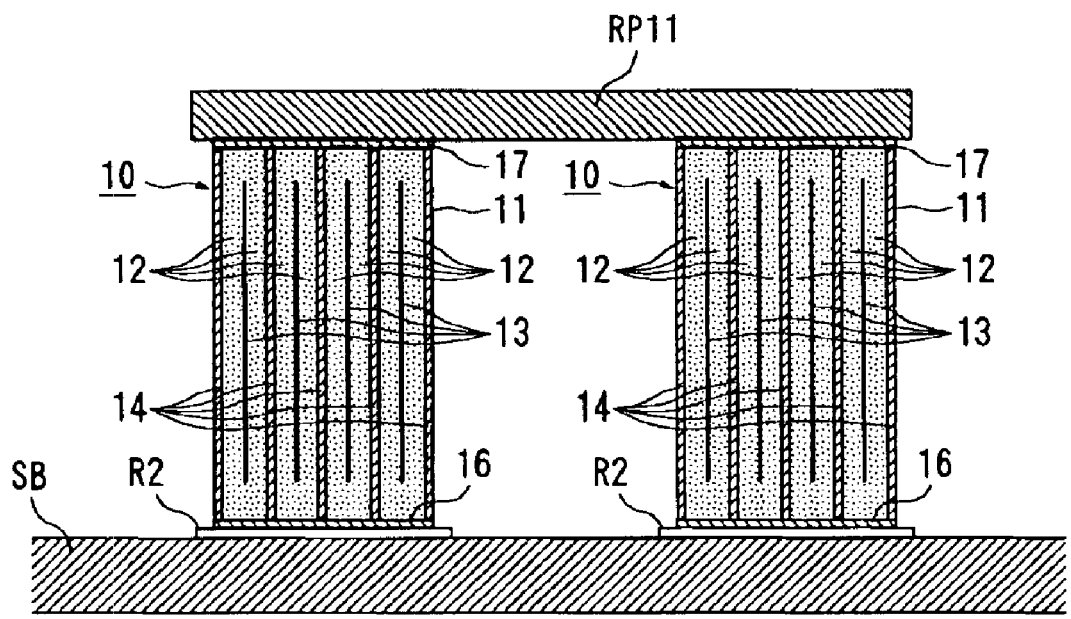
FIG. 15 is a vertical sectional view showing a modified example of the heat radiation conductor in the case of arranging and mounting two or more laminated ceramic capacitors on a substrate.

In addition, when two or more laminated ceramic capacitors 10 are arranged and mounted on the substrate SB, it is also good as shown in FIG. 15 to connect a common conductive plate (heat sink) RP11, which is made of high heat conductivity metal such as aluminum, to the conductive films (17) of a plurality of laminated ceramic capacitors 10. An object having a shape corresponding to an arrangement form of two or more laminated ceramic capacitors 10 arranged and mounted on the substrate SB is used for the common conductive plate RP 11.

Figure 16:
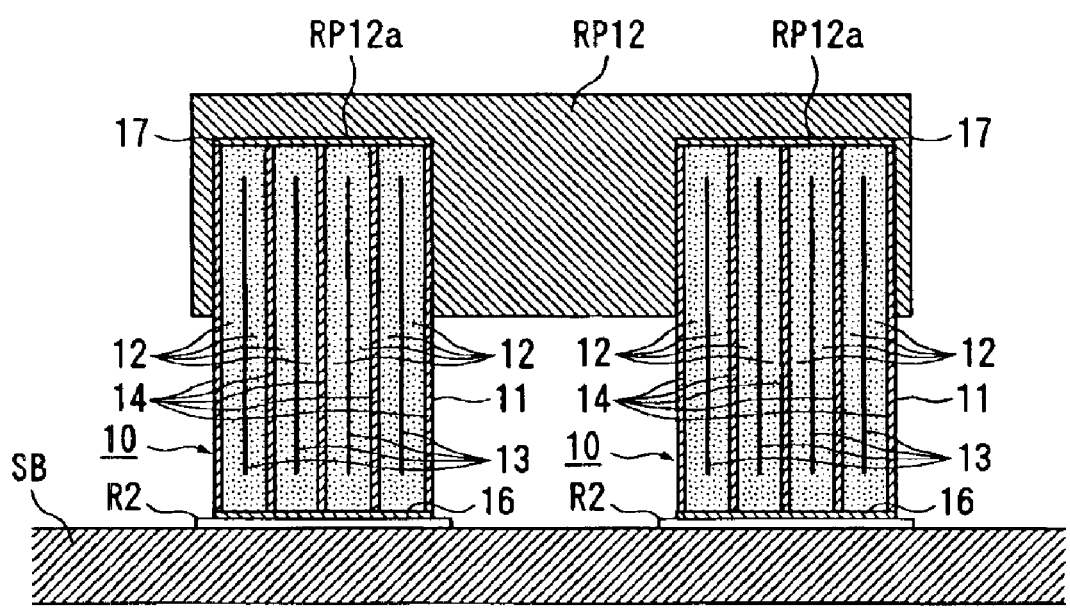
FIG. 16 is a vertical sectional view showing another modified example of the heat radiation conductor in the case of arranging and mounting two or more laminated ceramic capacitors on a substrate.
Figure 17:
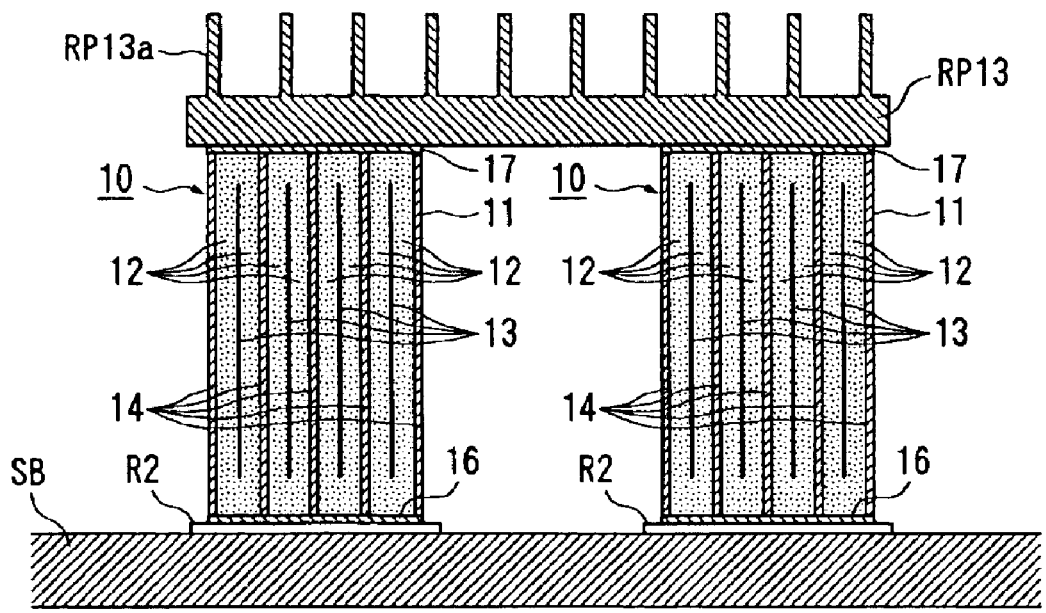
FIG. 17 is a vertical sectional view showing still another modified example of the heat radiation conductor in the case of arranging and mounting two or more laminated ceramic capacitors on a substrate.
Figure 18:
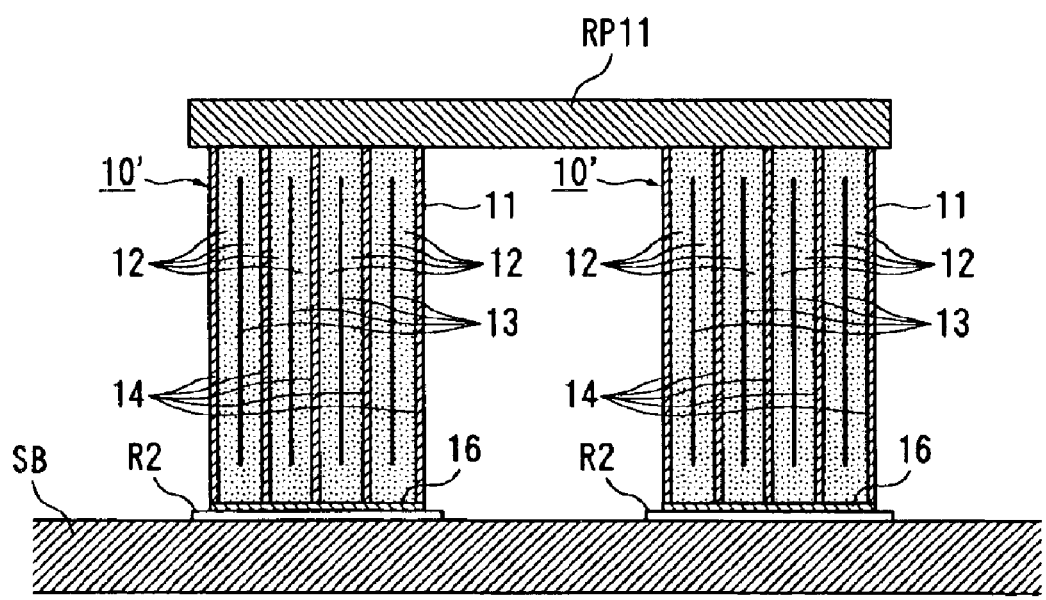
FIG. 18 is a vertical sectional view showing a further modified example of the heat radiation conductor in the case of arranging and mounting two or more laminated ceramic capacitors on a substrate.

Moreover, it is also possible to use as this common conductive plate an object (RP12) having a concavity RP12a which accepts a part of the laminated chip 11 as shown in FIG. 16, and an object (RP13) having a plurality of fins RP13a as shown in FIG. 17 besides a plate-like object. In addition, when providing a conductive plate RP11 so as to be connected to the upper edge of each second conductor layer 14 of a plurality of laminated ceramic capacitors 10 as shown in FIG. 18, it is also possible to use the laminated ceramic capacitor 10' having the structure that the above-mentioned conductive films (17) are eliminated.

Figure 19:
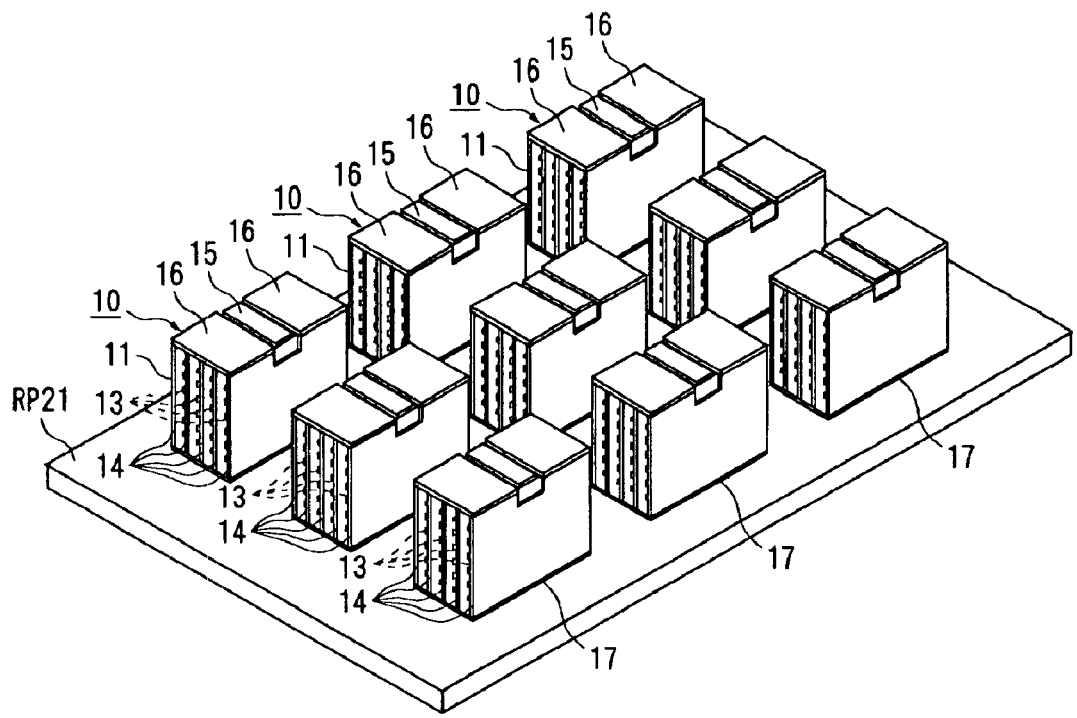
FIG. 19 is a perspective view showing a capacitor module.

Furthermore, by producing beforehand capacitor modules as shown in FIG. 19 when two or more laminated ceramic capacitors 10 are arranged and mounted on a substrate, it is possible to simply mount the laminated ceramic capacitors 10 on the substrate.

The capacitor module shown in FIG. 19 is constituted by providing a plurality of laminated ceramic capacitors 10 on a face of a conductive plate (heat sink) RP21, made of high heat conductivity metal such as aluminum, in predetermined arrangement so that the conductive films (17) may connect to each other. Hence, when mounting on a substrate is performed, it is possible to mount a plurality of laminated ceramic capacitors on the substrate in a lump by using the conductive plate RP21. A heat radiating action after mounting is as explained above.

Figure 20:
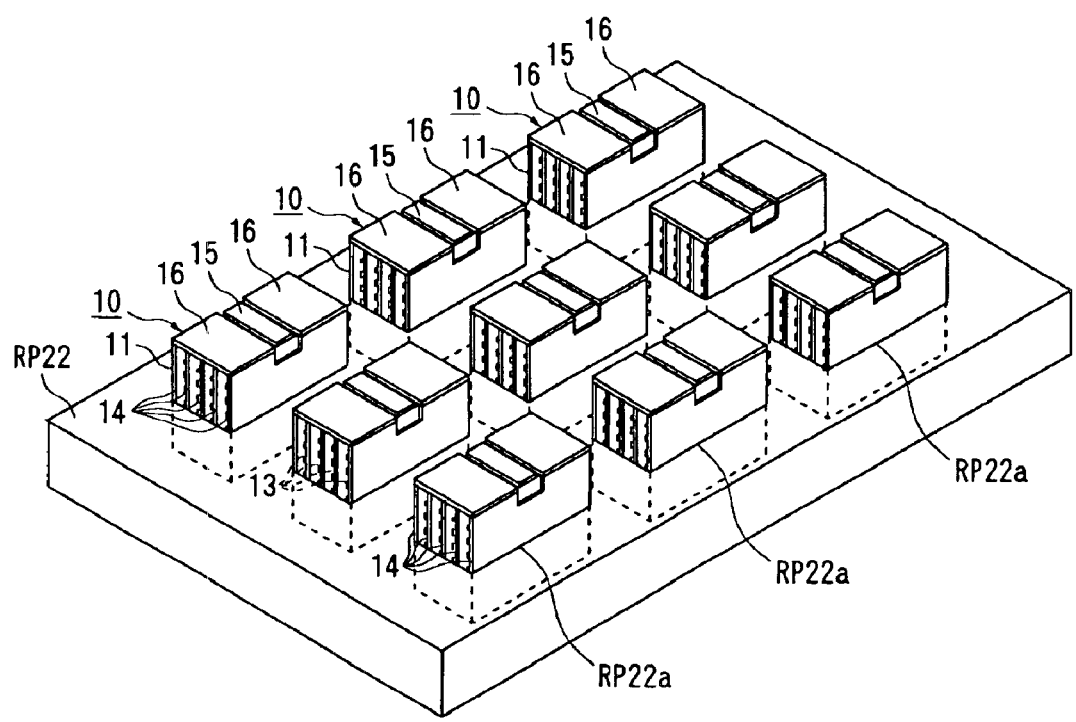
FIG. 20 is a perspective view showing a modified example of the capacitor module shown in FIG. 19.
Figure 21:
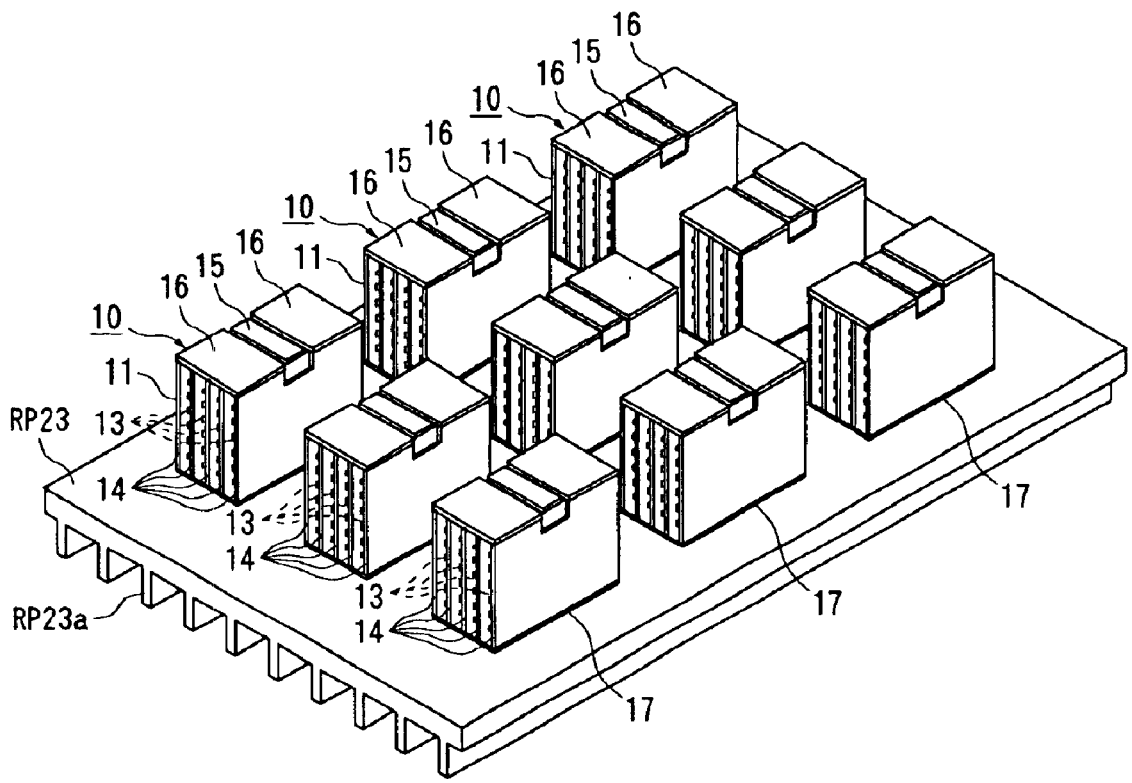
FIG. 21 is a perspective view showing another modified example of the capacitor module shown in FIG. 19.
Figure 22:
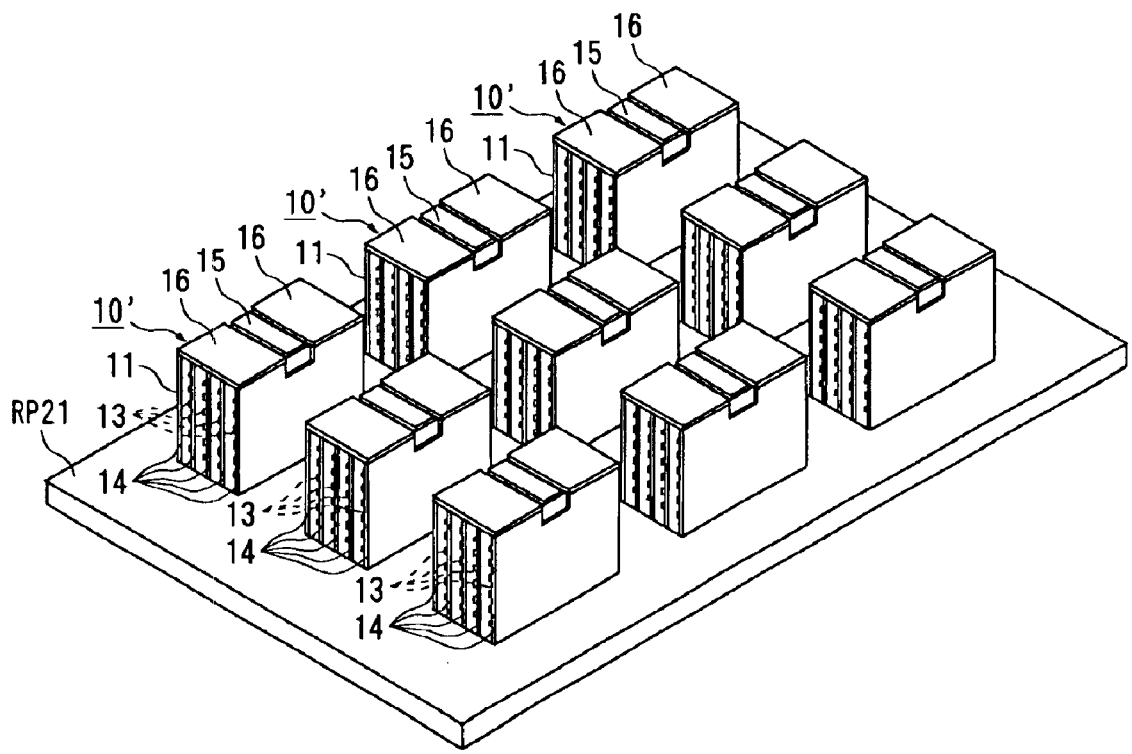
FIG. 22 is a perspective view showing still another modified example of the capacitor module shown in FIG. 19.

It is also possible to use as this conductive plate an object (RP22) having a concavity RP22a which accepts a part of the laminated chip 11 as shown in FIG. 20, and an object (RP23) having a plurality of fins RP23a as shown in FIG. 21 besides a plate-like object. In addition, when providing a plurality of laminated ceramic capacitors 10 so that the upper edge of each second conductor layer 14 may connect to a face of the conductive plate RP21 as shown in FIG. 22, it is also possible to use the laminated ceramic capacitor 10' having the structure that the above-mentioned conductive films (17) are eliminated.

Figure 23:
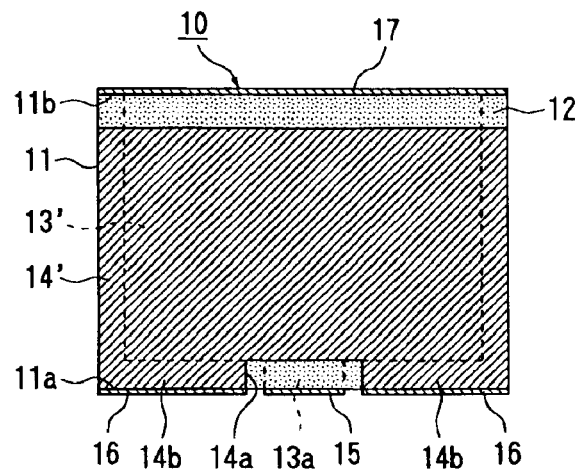
FIG. 23 is a vertical sectional view showing a modified example of the laminated ceramic capacitor shown in FIG. 4A.

Furthermore, in the above-described laminated ceramic capacitor 10, each upper edge of the second conductor layers 14 is exposed on the top face 11b of the laminated chip 11 and this is connected to the heat radiation conductor 17. Nevertheless, as shown in FIG. 23, even when each upper edge of second conductor layers 14' is located in the inside apart from the top face 11b of the laminated chip 11, each upper edge of first conductor layers 13' is exposed on the top face 11b of the laminated chip 11, and this is connected to the heat radiation conductor 17, it is also possible to obtain the same radiating effects as the above-described ones.

Hereinafter, other embodiments of a laminated ceramic capacitor which can be substituted for the laminated ceramic capacitor 10 shown in FIGS. 4 to 7 will be explained with citing FIGS. 24 to 43.

Figure 24:
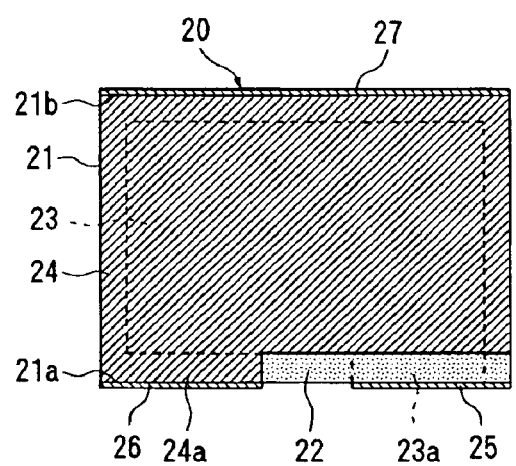
FIG. 24 is a vertical sectional view a laminated ceramic capacitor which shows a second embodiment of the laminated ceramic capacitor.

FIG. 24 shows a second embodiment of the laminated ceramic capacitor.

Incidentally, FIG. 24 includes a laminated ceramic capacitor 20, a laminated chip 21, a bottom face 21a of the laminated chip, a top face 21b of the laminated chip, ceramic layers 22, first conductor layers 23, lead sections 23a, second conductor layers 24, lead sections 24a, a first electrode 25, a second electrode 26, and a heat radiation conductor 27.

The difference between this laminated ceramic capacitor 20 and the above-mentioned laminated ceramic capacitor 10 is that the numbers of the first electrode 25 and second electrode 26 are made one and one respectively, and the numbers of the lead sections 23a and 24a of respective conductor layers 23 and 24 are made one and one respectively.

According to this laminated ceramic capacitor 20, it is possible to obtain the same radiating effect as the above-mentioned laminated ceramic capacitor 10 by directly and efficiently transferring the heat of the respective second conductor layers 24 to the heat radiation conductor 27.

Figure 25A:
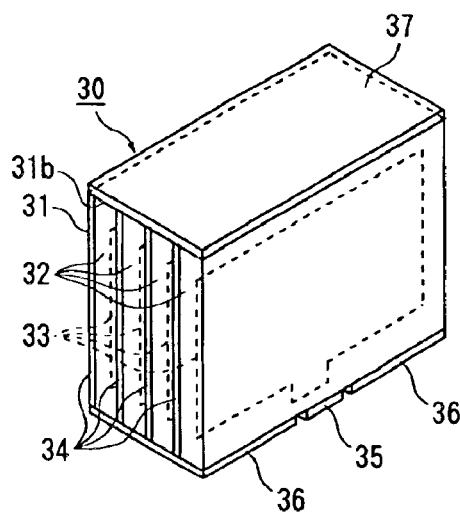
FIG. 25A is a perspective view of a laminated ceramic capacitor which shows a third embodiment of the laminated ceramic capacitor.

FIG. 25A shows a third embodiment of the laminated ceramic capacitor.

Incidentally, FIG. 25A includes a laminated ceramic capacitor 30, a laminated chip 31, a bottom face 31a of the laminated chip, a top face 31b of the laminated chip, ceramic layers 32, first conductor layers 33, second conductor layers 34, a first electrode 35, a second electrode 36, and a heat radiation conductor 37.

The difference between this laminated ceramic capacitor 30 and the above-mentioned laminated ceramic capacitor 10 is that the second conductor layer located in one side face in the laminated direction of conductor layers of the laminated chip 31 is eliminated, and the ceramic layer 32 is exposed on the side face thereof.

According to this laminated ceramic capacitor 30, it is possible to obtain the same radiating effect as the above-mentioned laminated ceramic capacitor 10 by directly and efficiently transferring the heat of the respective second conductor layers 34 to the heat radiation conductor 37.

Figure 25B:
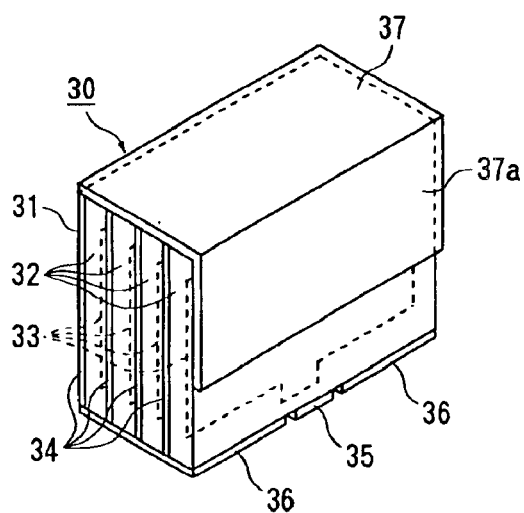
FIG. 25B is a perspective view showing a modified example of the laminated ceramic capacitor shown in FIG. 25A.

In addition, in this laminated capacitor 30, the ceramic layer 32 exposes on one side face in the laminated direction of conductor layers of the laminated chip 31. Hence, it is possible to continuously provide a portion 37a, rounding to one side face, for the heat radiation conductor 37 made of a conductive film as shown in FIG. 25B. Thereby, it is possible to more effectively perform heat radiation by enlarging a heat radiation area of the heat radiation conductor 37. In this case, it is also possible to connect the above-mentioned conductive plate (heat sink) to the rounding portion 37a of the heat radiation conductor 37.

Figure 26A:
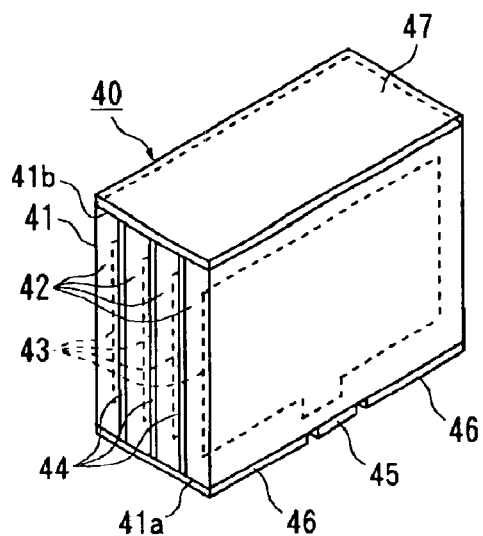
FIG. 26A is a perspective view of a laminated ceramic capacitor which shows a fourth embodiment of the laminated ceramic capacitor.

FIG. 26A shows a fourth embodiment of the laminated ceramic capacitor.

Incidentally, FIG. 26A includes a laminated ceramic capacitor 40, a laminated chip 41, a bottom face 41a of the laminated chip, a top face 41b of the laminated chip, ceramic layers 42, first conductor layers 43, second conductor layers 44, a first electrode 45, a second electrode 46, and a heat radiation conductor 47.

The difference between this laminated ceramic capacitor 40 and the above-mentioned laminated ceramic capacitor 10 is that the second conductor layers located in both side faces in the laminated direction of conductor layers of the laminated chip 41 are eliminated, and the ceramic layers 42 are exposed on both the side faces.

According to this laminated ceramic capacitor 40, it is possible to obtain the same radiating effect as the above-mentioned laminated ceramic capacitor 10 by directly and efficiently transferring the heat of the respective second conductor layers 44 to the heat radiation conductor 47.

Figure 26B:
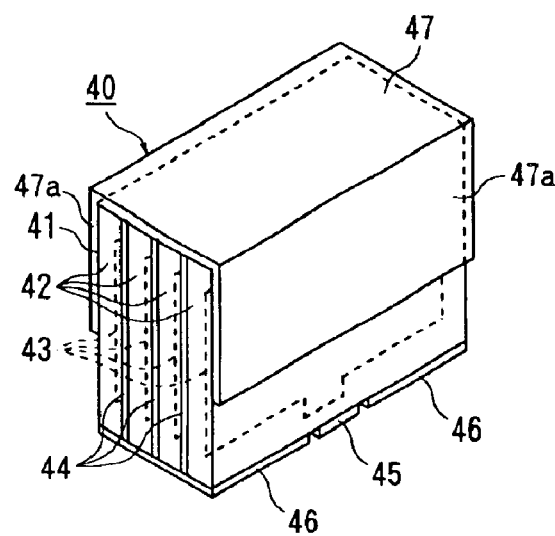
FIG. 26B is a perspective view showing a modified example of the laminated ceramic capacitor shown in FIG. 26A.

In addition, in this laminated capacitor 40, the ceramic layers 42 expose on both side faces in the laminated direction of conductor layers of the laminated chip 41. Hence, it is possible to continuously provide portions 47a, rounding to both side faces, for the heat radiation conductor 47 made of a conductive film as shown in FIG. 26B. Thereby, it is possible to more effectively perform heat radiation by enlarging a heat radiation area of the heat radiation conductor 47. In this case, it is also possible to connect the above-mentioned conductive plate (heat sink) to at least one of the rounding portions 47a of the heat radiation conductor 47.

Figure 26C:
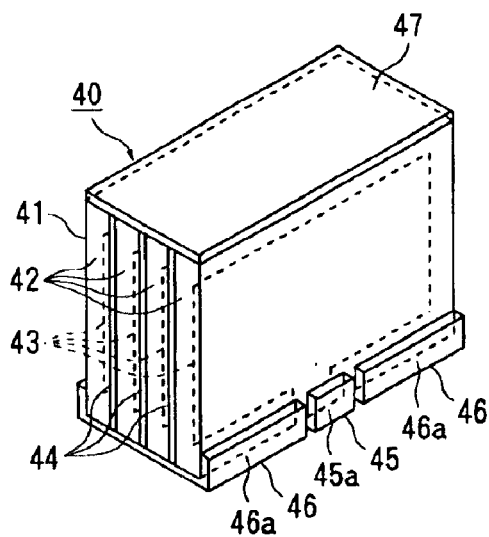
FIG. 26C is a perspective view showing another modified example of the laminated ceramic capacitor shown in FIG. 26A.

Furthermore, in this laminated capacitor 40, the ceramic layers 42 expose on both side faces in the laminated direction of conductor layers of the laminated chip 41. As shown in FIG. 26C, it is possible to provide portions 45a and 46a, which round to both side faces in both directions, for the first electrode 45 and second electrode 46 respectively. Thereby, it is possible to increase bond strength by enlarging a bonding area of bonding material at the time of mounting the laminated ceramic capacitor 40 on a substrate by using bonding material such as solder.

Figure 27A:
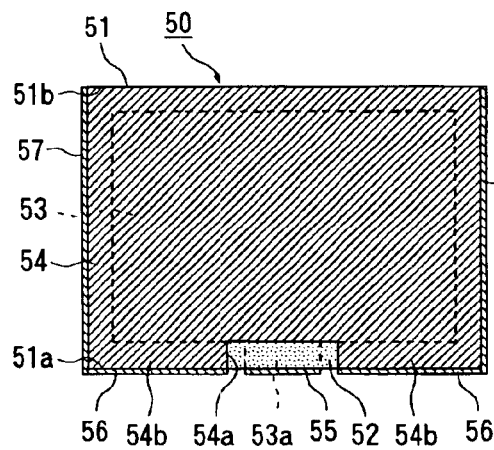
FIG. 27A is a vertical sectional view of a laminated ceramic capacitor which shows a fifth embodiment of the laminated ceramic capacitor.

FIG. 27A shows a fifth embodiment of the laminated ceramic capacitor.

Incidentally, FIG. 27A includes a laminated ceramic capacitor 50, a laminated chip 51, a bottom face 51a of the laminated chip, a top face 51b of the laminated chip, ceramic layers 52, first conductor layers 53, lead sections 53a, second conductor layers 54, notch sections 54a, lead sections 54b, a first electrode 55, a second electrode 56, and a heat radiation conductor 57.

The differences between this laminated ceramic capacitor 50 and the above-mentioned laminated ceramic capacitor 10 are that the heat radiation conductor is eliminated from the top face of the laminated chip 51, and the heat radiation conductors 57, made of each conductive film, are formed respectively on two side faces in the direction orthogonal to the laminated direction of conductor layers of the laminated chip 51 so as to cover the entire side faces and is connected to the side edges of the second conductor layers 54, and that each lower edge of the heat radiation conductors 57 is connected to the second electrode 56.

According to this laminated ceramic capacitor 50, it is possible to obtain the same radiating effect as the above-mentioned laminated ceramic capacitor 10 by directly and efficiently transferring the heat of the respective second conductor layers 54 to the heat radiation conductors 57.

Figure 27B:
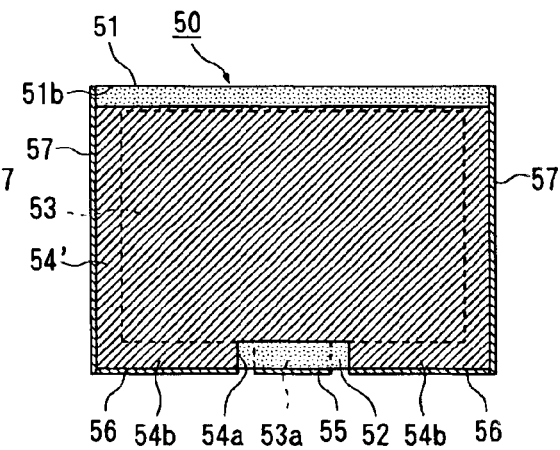
FIG. 27B is a vertical sectional view showing a modified example of the laminated ceramic capacitor shown in FIG. 27A.

In addition, in this ceramic capacitor 50, as shown in FIG. 27B, even when each upper edge of second conductor layers 54' is located in the inside apart from the top face 51b of the laminated chip 51, it is also possible to obtain the same radiating effect.

Figure 27C:
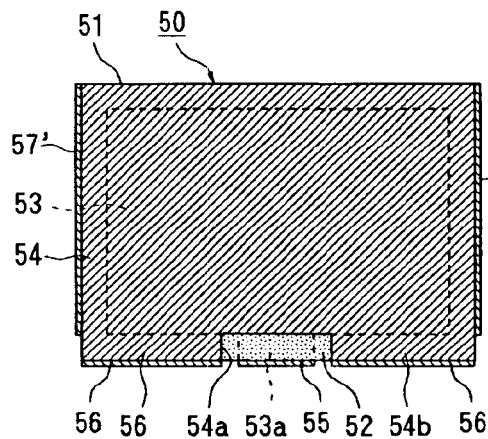
FIG. 27C is a vertical sectional view showing another modified example of the laminated ceramic capacitor shown in FIG. 27A.

Furthermore, in this ceramic capacitor 50, as shown in FIG. 27C, when each heat radiation conductor 57' is provided lest the lower edge thereof should connect to the second electrode 56, it is also possible to obtain the same radiating effect.

Figure 27D:
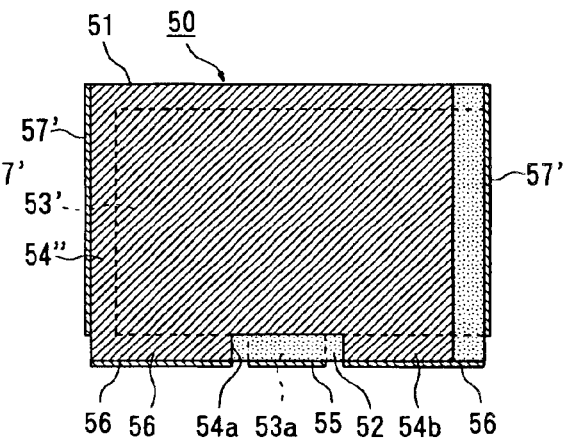
FIG. 27D is a vertical sectional view showing still another modified example of the laminated ceramic capacitor shown in FIG. 27A.

Moreover, when adopting a form of the heat radiation conductor 57' as shown in FIG. 27C, as shown in FIG. 27D, it is also good to expose one side edge of a first conductor layer 53' from one side face in the direction orthogonal to the laminated direction of conductor layers of the laminated chip 11 and to connect the one side edge to one of heat radiation conductors 57', and to expose one side edge of a second conductor layer 54" from one side face in the direction orthogonal to the laminated direction of conductor layers of the laminated chip 11 and to connect the one side edge to another one of the heat radiation conductors 57'. Thereby, it is possible to directly and efficiently transfer the heat of the respective first conductor layers 53' to one of the heat radiation conductors 57', and to directly and efficiently transfer the heat of the respective second conductor layers 54" to another one of the heat radiation conductors 57'. Hence, it is possible to radiate the heat of the capacitor itself to the outside much more effectively.

In the laminated ceramic capacitor 50 of this fifth embodiment, it is also possible to connect the above-mentioned conductive plate (heat sink) to at least one of the heat radiation conductors 57 and 57'.

Figure 28A:
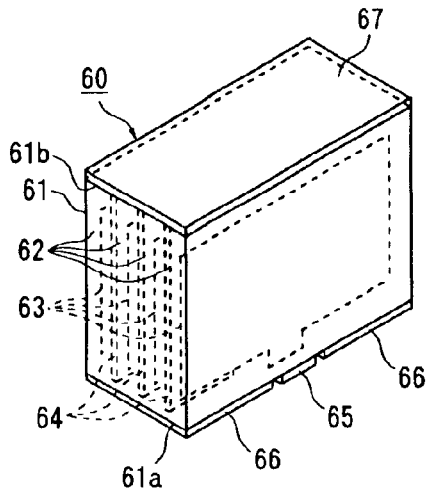
FIG. 28A is a perspective view of a laminated ceramic capacitor which shows a sixth embodiment of the laminated ceramic capacitor.
Figure 28B:
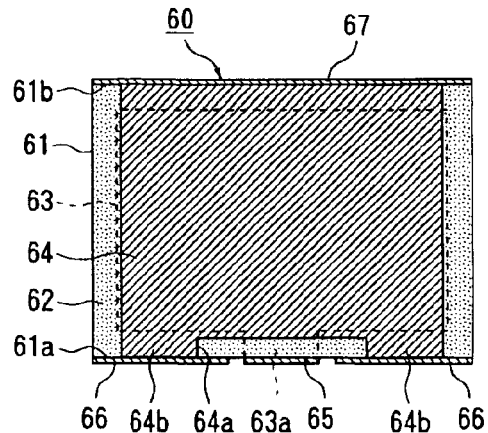
FIG. 28B is a vertical sectional view of the laminated ceramic capacitor shown in FIG. 28A.

FIGS. 28A and 28B show a sixth embodiment of the laminated ceramic capacitor.

Incidentally, FIGS. 28A and 28B include a laminated ceramic capacitor 60, a laminated chip 61, a bottom face 61a of the laminated chip, a top face 61b of the laminated chip, ceramic layers 62, first conductor layers 63, lead sections 63a, second conductor layers 64, notch sections 64a, lead sections 64b, a first electrode 65, a second electrode 66, and a heat radiation conductor 67.

The differences between this laminated ceramic capacitor 60 and the above-mentioned laminated ceramic capacitor 10 are that the second conductor layers located in two side faces of the laminated direction of conductor layers of the laminated chip 61 are eliminated, and hence, the ceramic layers 62 are exposed on both side faces, and that both side edges of the respective second conductor layers 64 are located in the inside apart from two side faces in the direction orthogonal to the laminated direction of conductor layers of the laminated chip 61.

According to this laminated ceramic capacitor 60, it is possible to obtain the same radiating effect as the above-mentioned laminated ceramic capacitor 10 by directly and efficiently transferring the heat of the respective second conductor layers 64 to the heat radiation conductor 67.

Figure 28C:
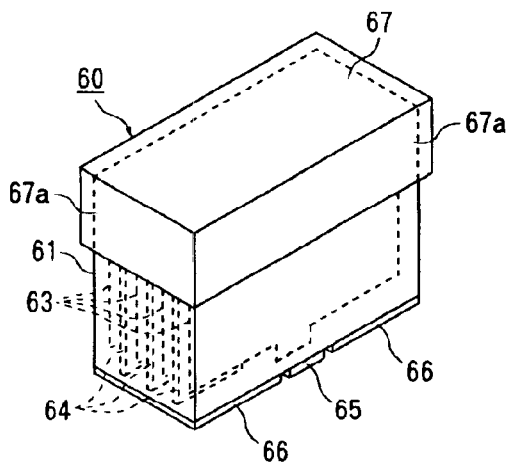
FIG. 28C is a perspective view showing a modified example of the laminated ceramic capacitor shown in FIG. 28A.
Figure 28D:
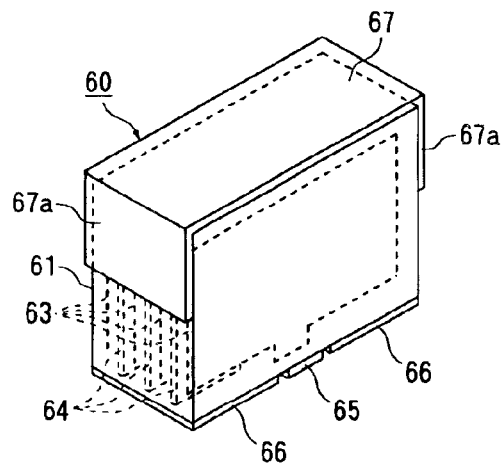
FIG. 28D is a perspective view showing another modified example of the laminated ceramic capacitor shown in FIG. 28A.
Figure 28E:
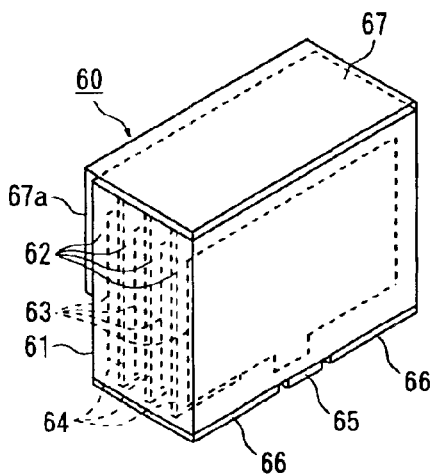
FIG. 28E is a perspective view showing still another modified example of the laminated ceramic capacitor shown in FIG. 28A.

In addition, in this laminated capacitor 60, the ceramic layers 62 expose on both side faces in the laminated direction of conductor layers of the laminated chip 61 and both side faces in the direction orthogonal to the laminated direction of conductor layers. Hence, it is possible to continuously provide portions 67a, rounding to four side faces, for the heat radiation conductor 67 made of a conductive film as shown in FIG. 28C. Further, it is also possible to continuously provide portions 67a, rounding to two or three side faces, for the heat radiation conductor 67 made of a conductive film as shown in FIG. 28D. Alternatively, it is also possible to continuously provide a portion 67a, rounding to one side face, for the heat radiation conductor 67 made of a conductive film as shown in FIG. 28E. Thereby, it is possible to more effectively perform heat radiation by enlarging a heat radiation area of the heat radiation conductor 67.

Figure 28F:
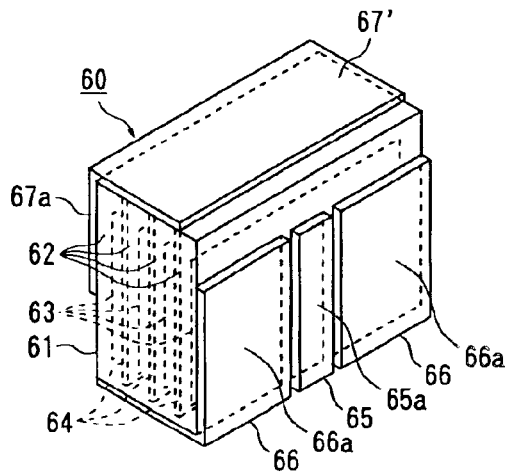
FIG. 28F is a perspective view showing a further modified example of the laminated ceramic capacitor shown in FIG. 28A.

Moreover, when adopting a form of the heat radiation conductor 67 as shown in FIG. 28E, by providing portions 65a and 66a, which largely round to side faces where the rounding portion 67a does not exist, for the first electrode 65 and second electrode 66 respectively as shown in FIG. 28F, and making a top face portion of a heat radiation conductor 67' apart from the side face on which the rounding portion 67a does not exist, it is also possible to constitute a laminated ceramic capacitor which can be mounted in such a sideways posture that the rounding portions 65a and 66a of the first electrode 65 and second electrodes 66 face the mounting surface of a substrate.

In the laminated ceramic capacitor 60 of this sixth embodiment, it is also possible to increase the bond strength at the time of mounting on a substrate by providing a rounding portion, as explained in FIG. 26C, in each electrode. In addition, it is also possible to connect the above-mentioned conductive plate (heat sink) to the rounding portions 67a of the heat radiation conductors 67 and 67'.

Figure 29A:
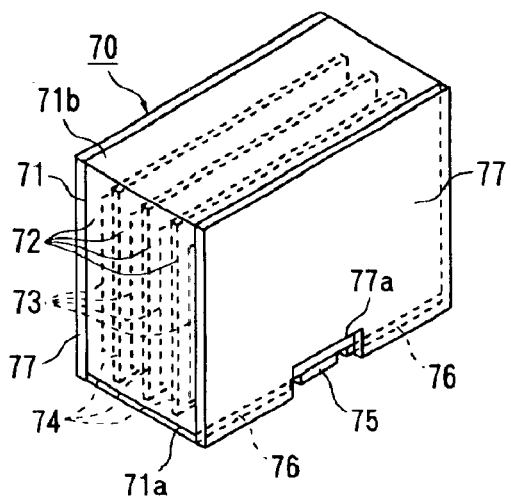
FIG. 29A is a perspective view of a laminated ceramic capacitor which shows a seventh embodiment of the laminated ceramic capacitor.
Figure 29B:
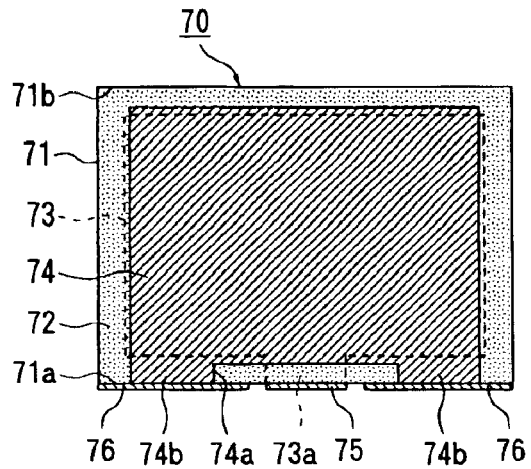
FIG. 29B is a vertical sectional view of the laminated ceramic capacitor shown in FIG. 29A.

FIGS. 29A and 29B show a seventh embodiment of the laminated ceramic capacitor.

Incidentally, FIGS. 29A and 29B include a laminated ceramic capacitor 70, a laminated chip 71, a bottom face 71a of the laminated chip, a top face 71b of the laminated chip, ceramic layers 72, first conductor layers 73, lead sections 73a, second conductor layers 74, notch sections 74a, lead sections 74b, a first electrode 75, a second electrode 76, and a heat radiation conductor 77.

The differences between this laminated ceramic capacitor 70 and the above-mentioned laminated ceramic capacitor 10 are that the second conductor layers located in two side faces of the laminated direction of conductor layers of the laminated chip 71 are eliminated, and hence, the ceramic layers 72 are exposed on both side faces, that the heat radiation conductors 77 made of each conductive film are formed so as to cover the entire two side faces (except a notch section 77a) in the laminated direction of conductor layers of the laminated chip 71, that each lower edge of the heat radiation conductor 77 is connected to each second electrode 76, and that an upper edge of each second conductor layer 74 is in an inside position apart from a top face of the laminated chip 71, and furthermore, both side edges of each second conductor layer 74 are in inside positions apart from two side faces in the direction orthogonal to the laminated direction of conductor layers of the laminated chip 71.

According to this laminated ceramic capacitor 70, it is possible to obtain the same radiating effect as the above-mentioned laminated ceramic capacitor 10 by directly and efficiently transferring the heat of the respective second conductor layers 74 to the heat radiation conductor 77 via the second electrode.

Figure 29C:
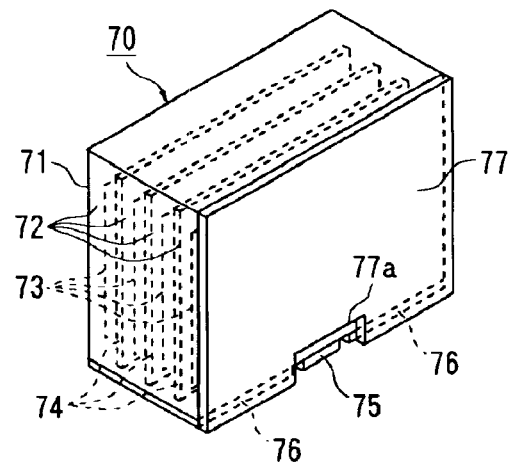
FIG. 29C is a perspective view showing a modified example of the laminated ceramic capacitor shown in FIG. 29A.
Figure 29D:
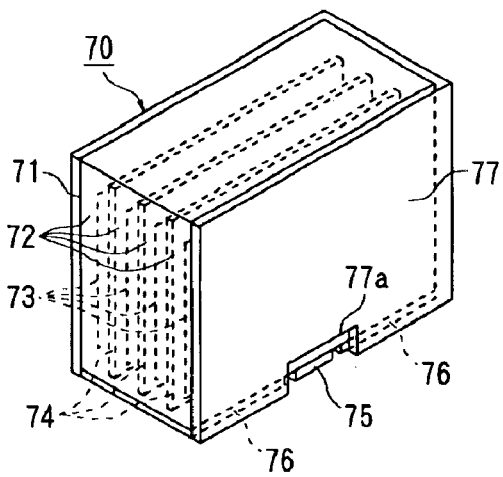
FIG. 29D is a perspective view showing another modified example of the laminated ceramic capacitor shown in FIG. 29A.
Figure 29E:
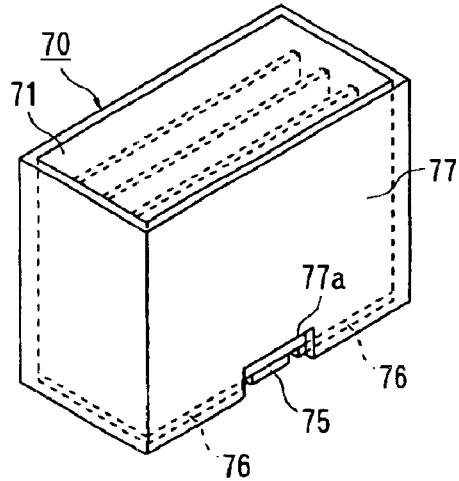
FIG. 29E is a perspective view showing still another modified example of the laminated ceramic capacitor shown in FIG. 29A.

In addition, the above-mentioned heat radiation conductor 77 may be provided only on one side face in the laminated direction of conductor layers of the laminated chip 71 as shown in FIG. 29C. Further, the heat radiation conductors 77 may be provided on two side faces in the laminated direction of conductor layers of the laminated chip 71 and on one side face in the direction orthogonal to the laminated direction of conductor layers as shown in FIG. 29D. Alternatively, they may be provided on two side faces in the laminated direction of conductor layers of the laminated chip 71 and on two side faces in the direction orthogonal to the laminated direction of conductor layers as shown in FIG. 29E.

In the laminated ceramic capacitor 70 of this seventh embodiment, it is also possible to connect the above-mentioned conductive plate (heat sink) to at least one side face of the heat radiation conductors 77.

Figure 30A:
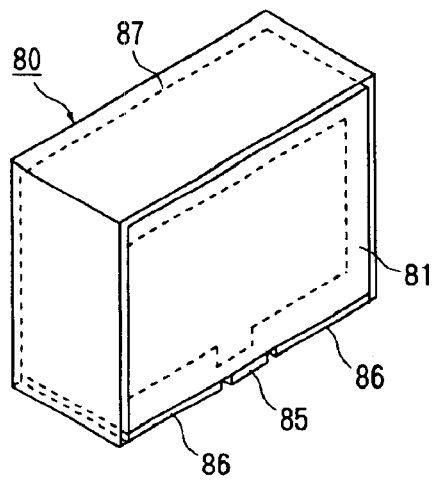
FIG. 30A is a perspective view of a laminated ceramic capacitor which shows an eighth embodiment of the laminated ceramic capacitor.
Figure 30B:
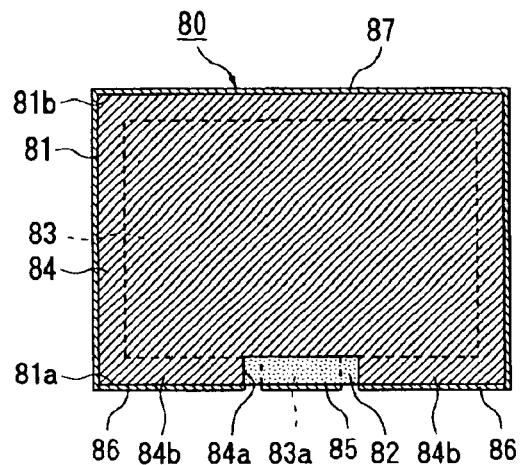
FIG. 30B is a vertical sectional view of the laminated ceramic capacitor shown in FIG. 30A.

FIGS. 30A and 30B show an eighth embodiment of the laminated ceramic capacitor.

Incidentally, FIGS. 30A and 30B include a laminated ceramic capacitor 80, a laminated chip 81, a bottom face 81a of the laminated chip, a top face 81b of the laminated chip, ceramic layers 82, first conductor layers 83, lead sections 83a, second conductor layers 84, notch sections 84a, lead sections 84b, a first electrode 85, a second electrode 86, and a heat radiation conductor 87.

The differences between this laminated ceramic capacitor 80 and the above-mentioned laminated ceramic capacitor 10 are that the second conductor layers located in two side faces in the laminated direction of conductor layers of the laminated chip 81 are eliminated, and hence, the ceramic layers 82 are exposed on both side faces, that the heat radiation conductors 87 made of each conductive film are formed so as to cover the entire top face 81b of the laminated chip 81 and two side faces orthogonal to the laminated direction of conductor layers, and that a side face portion of the heat radiation conductor 87 is connected to side edges of the second conductor layers 84, and the lower edges of the side face portion are connected to the second electrodes 86.

According to this laminated ceramic capacitor 80, it is possible to obtain the same radiating effect as the above-mentioned laminated ceramic capacitor 10 by directly and efficiently transferring the heat of the respective second conductor layers 84 to the heat radiation conductor 87.

Figure 30C:
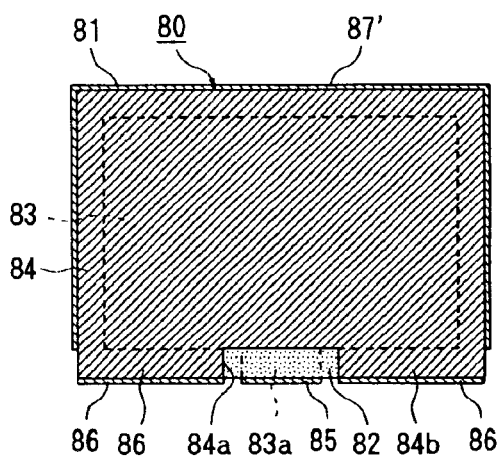
FIG. 30C is a vertical sectional diagram showing a modified example of the laminated ceramic capacitor shown in FIG. 30A.

Furthermore, in this ceramic capacitor 80, as shown in FIG. 30C, when a heat radiation conductor 87' is provided lest the lower edges of its side face portion should connect to the second electrodes 86, it is also possible to obtain the same radiating effect.

Figure 30D:
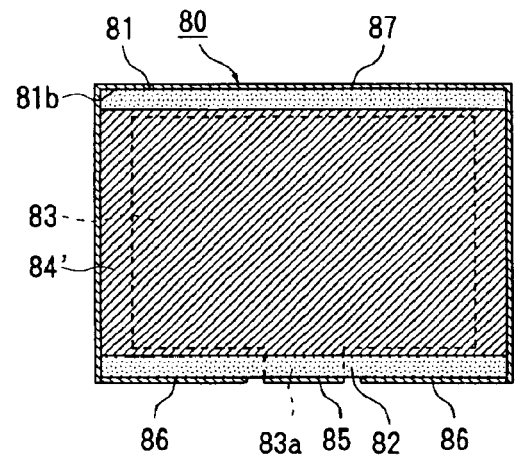
FIG. 30D is a vertical sectional view showing another modified example of the laminated ceramic capacitor shown in FIG. 30A.

In addition, in this laminated ceramic capacitor 80, since the lower edges of a side face portion of the heat radiation conductor 87 are connected to the second electrodes 86, as shown in FIG. 30D, even when each upper edge of second conductor layers 84' is located in the inside apart from the top face 81b of the laminated chip 81 and each lead electrode of the second conductor layers 84' is eliminated, it is also possible to obtain the same radiating effect. In this case, it is possible to perform the conduction between each second electrode 86 and each second conductor layer 84' through the side face portion of the heat radiation conductor 87.

Figure 30E:
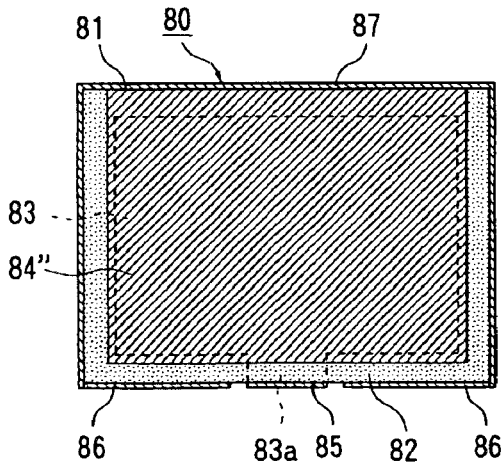
FIG. 30E is a vertical sectional view showing still another modified example of the laminated ceramic capacitor shown in FIG. 30A.

In addition, in this laminated ceramic capacitor 80, since the lower edges of a side face portion of the heat radiation conductor 87 are connected to the second electrodes 86, as shown in FIG. 30E, even when side edges of second conductor layers 84" are located in the inside apart from the two side faces in the direction orthogonal to the laminated direction of the laminated chip 81 and each lead electrode of the second conductor layers 84" is eliminated, it is also possible to obtain the same radiating effect. In this case, it is possible to perform the conduction between each second electrode 86 and each second conductor layer 84" through the top face portion and side face portion of the heat radiation conductor 87.

In the laminated ceramic capacitor 80 of this eighth embodiment, it is also possible to connect the above-mentioned conductive plate (heat sink) to at least one side face of the heat radiation conductors 87 and 87'.

Figure 31A:
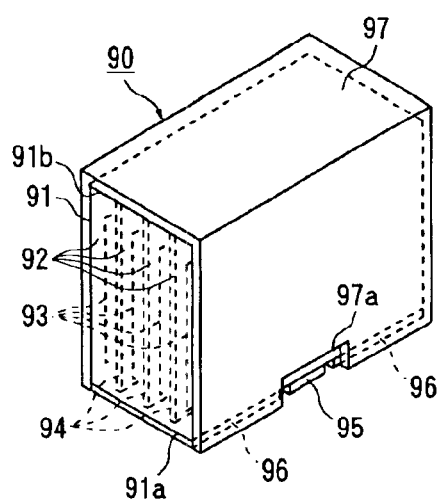
FIG. 31A is a perspective view of a laminated ceramic capacitor which shows a ninth embodiment of the laminated ceramic capacitor.
Figure 31B:
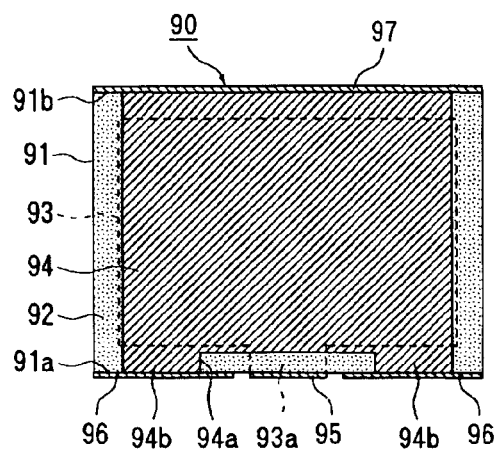
FIG. 31B is a vertical sectional view of the laminated ceramic capacitor shown in FIG. 31A.
Figure 31C:
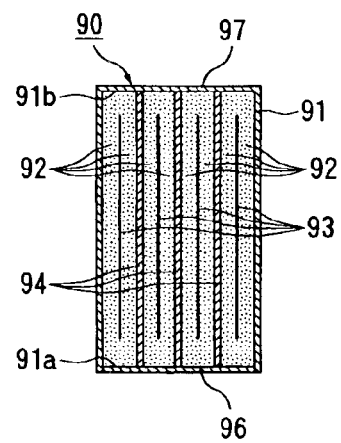
FIG. 31C is a vertical sectional view of the laminated ceramic capacitor shown in FIG. 31A.

FIGS. 31A to 31C show a ninth embodiment of the laminated ceramic capacitor.

Incidentally, FIGS. 31A to 31C include a laminated ceramic capacitor 90, a laminated chip 91, a bottom face 91a of the laminated chip, a top face 91b of the laminated chip, ceramic layers 92, first conductor layers 93, lead sections 93a, second conductor layers 94, notch sections 94a, lead sections 94b, a first electrode 95, a second electrode 96, and a heat radiation conductor 97.

The differences between this laminated ceramic capacitor 90 and the above-mentioned laminated ceramic capacitor 10 are that the second conductor layers located in two side faces in the laminated direction of conductor layers of the laminated chip 91 are eliminated, and hence, the ceramic layers 92 are exposed on both side faces, that the heat radiation conductor 97 made of a conductive film is formed so as to cover the entire top face 91b of the laminated chip 91 and the entire two side faces (except a notch section 97a) in the laminated direction of conductor layers, that lower edges of side face portions of the heat radiation conductor 97 are connected to the second electrodes 96, and that both side edges of the respective second conductor layers 94 are located in the inside apart from two side faces in the direction orthogonal to the laminated direction of conductor layers of the laminated chip 91.

According to this laminated ceramic capacitor 90, it is possible to obtain the same radiating effect as the above-mentioned laminated ceramic capacitor 10 by directly and efficiently transferring the heat of the respective second conductor layers 94 to the heat radiation conductor 97.

Figure 31D:
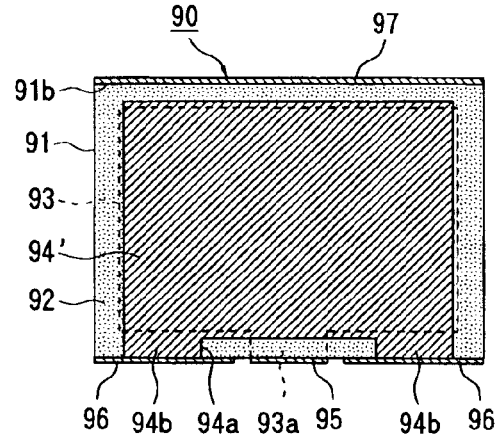
FIG. 31D is a vertical sectional diagram showing a modified example of the laminated ceramic capacitor shown in FIG. 31A.

In addition, in this laminated ceramic capacitor 90, since the lower edges of a side face portion of the heat radiation conductor 97 are connected to the second electrodes 96, as shown in FIG. 31D, even when each upper edge of second conductor layers 94' is located in the inside apart from the top face 91b of the laminated chip 91, it is also possible to obtain the same radiating effect since the heat of the respective second conductor layers 94' is transferred to the heat radiation conductor 97 through the second electrodes 96.

Figure 31E:
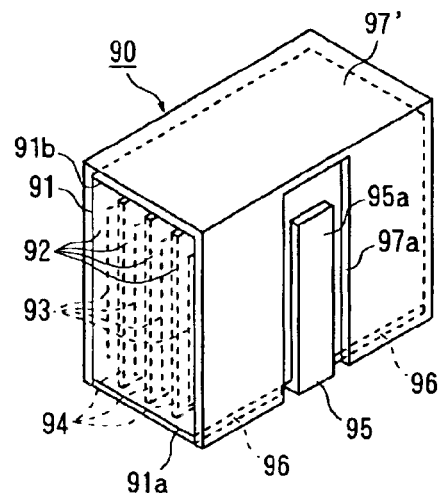
FIG. 31E is a perspective view showing another modified example of the laminated ceramic capacitor shown in FIG. 31A.

Furthermore, in this laminated ceramic capacitor 90, lower edges of side face portions of the heat radiation conductor 97 are connected to the second electrodes 96. Hence, by largely forming the notch section 97a on one of side face portions of a heat radiation electrode 97' as shown in FIG. 31E and providing a rounding portion 95a from the first electrode 95 inside this notch section 97a, it is also possible to constitute a laminated ceramic capacitor which can be mounted in such a sideways posture that the rounding portion 95a of the first electrode 95 faces the mounting surface of a substrate.

In the laminated ceramic capacitor 90 of this ninth embodiment, it is also possible to connect the above-mentioned conductive plate (heat sink) to at least one side face of the heat radiation conductors 97 and 97'.

Figure 32A:
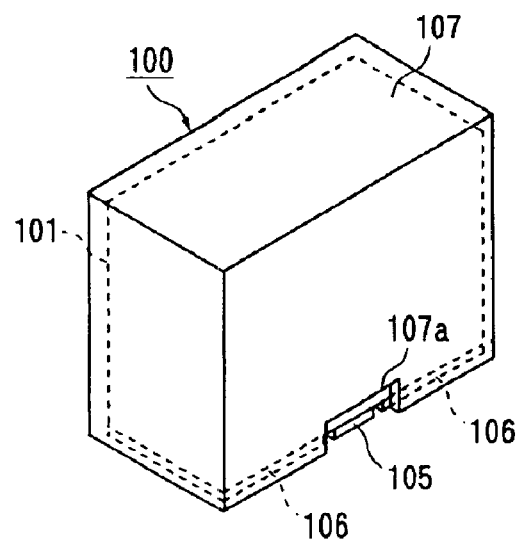
FIG. 32A is a perspective view of a laminated ceramic capacitor which shows a tenth embodiment of the laminated ceramic capacitor.
Figure 32B:
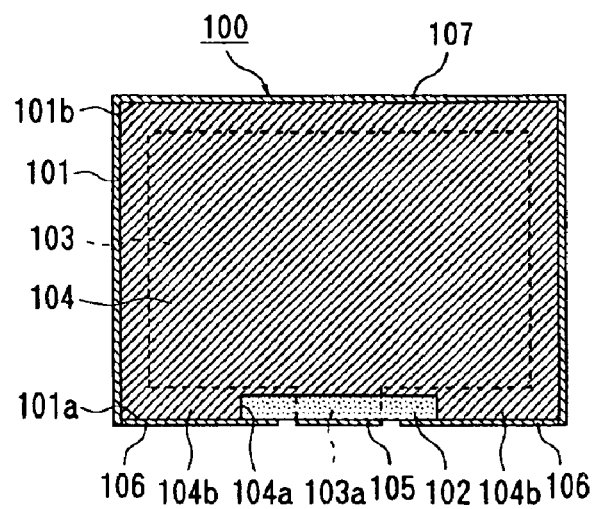
FIG. 32B is a vertical sectional view of the laminated ceramic capacitor shown in FIG. 32A.
Figure 32C:
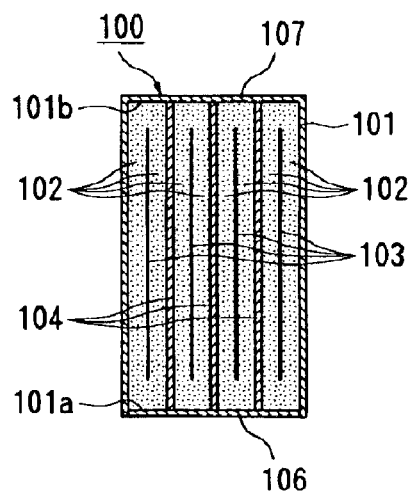
FIG. 32C is a vertical sectional view of the laminated ceramic capacitor shown in FIG. 32A.

FIGS. 32A to 32C show a tenth embodiment of the laminated ceramic capacitor.

Incidentally, FIGS. 32A to 32C include a laminated ceramic capacitor 100, a laminated chip 101, a bottom face 101a of the laminated chip, a top face 101b of the laminated chip, ceramic layers 102, first conductor layers 103, lead sections 103a, second conductor layers 104, notch sections 104a, lead sections 104b, a first electrode 105, a second electrode 106, and a heat radiation conductor 107.

The differences between this laminated ceramic capacitor 100 and the above-mentioned laminated ceramic capacitor 10 are that the second conductor layers located in two side faces in the laminated direction of conductor layers of the laminated chip 101 are eliminated, and hence, the ceramic layers 102 are exposed on both side faces, that the heat radiation conductor 107 made of a conductive film is formed so as to cover the entire top face 101b of the laminated chip 101, the entire two side faces (except a notch section 107a) in the laminated direction of conductor layers and the entire two side faces orthogonal to the laminated direction of conductor layers, and that lower edges of side face portions of the heat radiation conductor 107 are connected to the second electrodes 106.

According to this laminated ceramic capacitor 100, it is possible to obtain the same radiating effect as the above-mentioned laminated ceramic capacitor 10 by directly and efficiently transferring the heat of the respective second conductor layers 104 to the heat radiation conductor 107.

Figure 32D:
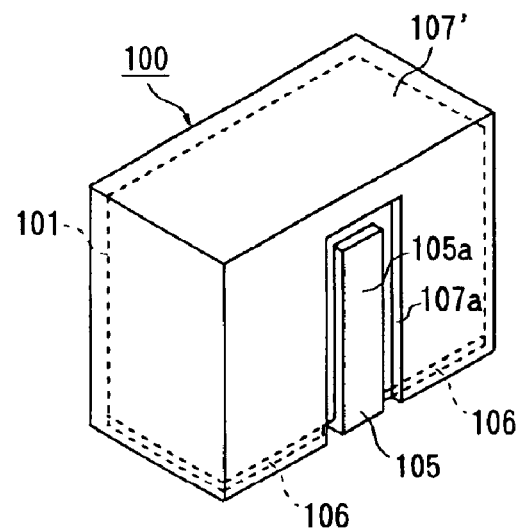
FIG. 32D is a perspective view showing a modified example of the laminated ceramic capacitor shown in FIG. 32A.

In addition, in this laminated ceramic capacitor 100, since lower edges of side face portions of the heat radiation conductor 107 are connected to the second electrodes 106, by largely forming the notch section 107a in one of side face portions of the heat radiation electrode 107' as shown in FIG. 32D and providing a rounding portion 105a from the first electrode 105 inside this notch section 107a, it is also possible to constitute a laminated ceramic capacitor which can be mounted in such a sideways posture that the rounding portion 105a of the first electrode 105 faces the mounting surface of a substrate.

In the laminated ceramic capacitor 100 of this tenth embodiment, it is also possible to connect the above-mentioned conductive plate (heat sink) to at least one side face of the heat radiation conductors 107 and 107'.

FIGS. 33 to 35 show an eleventh embodiment of the laminated ceramic capacitor. This laminated ceramic capacitor 200 has the number of the electrodes more than that of the laminated ceramic capacitor 10 shown in FIGS. 4 to 7, and basic constitution is not different from that of the laminated ceramic capacitor 10 shown in FIGS. 4 to 7.

Figure 33A:
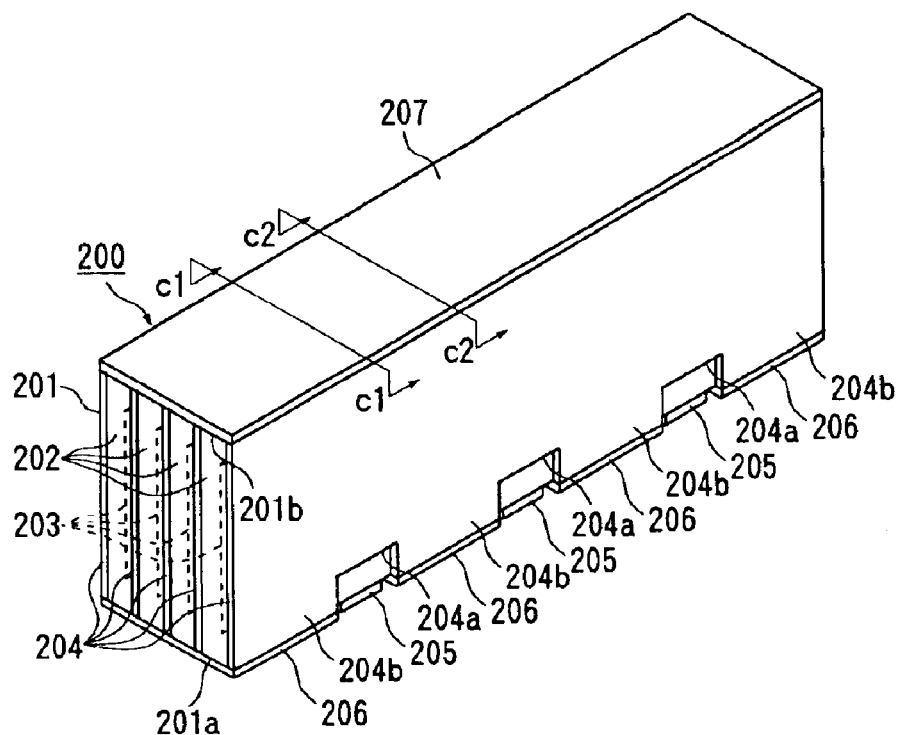
FIG. 33A is a perspective view in view of a top face side of the laminated ceramic capacitor which shows an eleventh embodiment of the laminated ceramic capacitor.
Figure 33B:
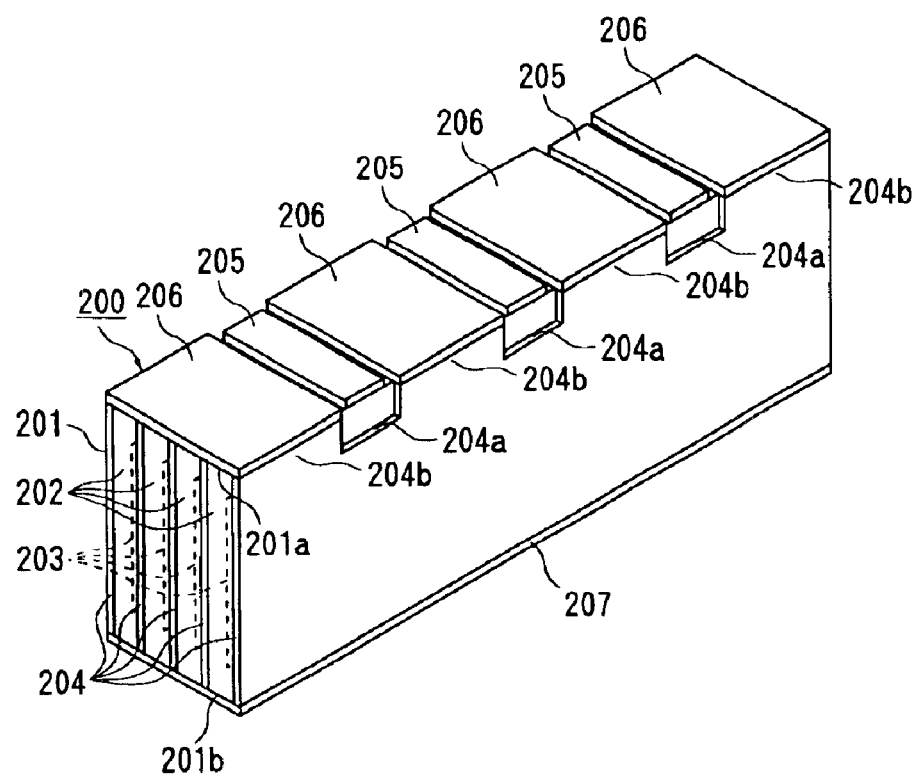
FIG. 33B is a perspective view in view of the bottom face side of the laminated ceramic capacitor shown in FIG. 33A.
Figure 34A:
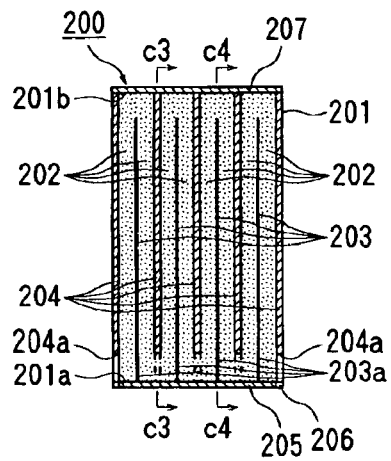
FIG. 34A is a sectional view taken on line c1—c1 in FIG. 33A.
Figure 34B:
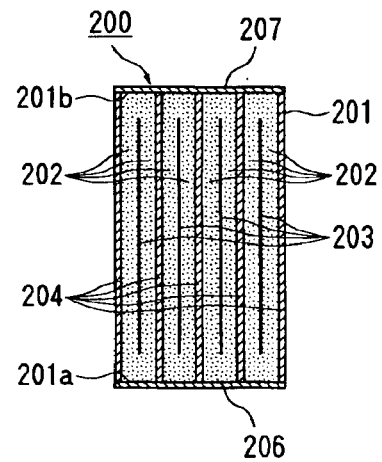
FIG. 34B is a sectional view taken on line c2—c2 in FIG. 33A.
Figure 35A:
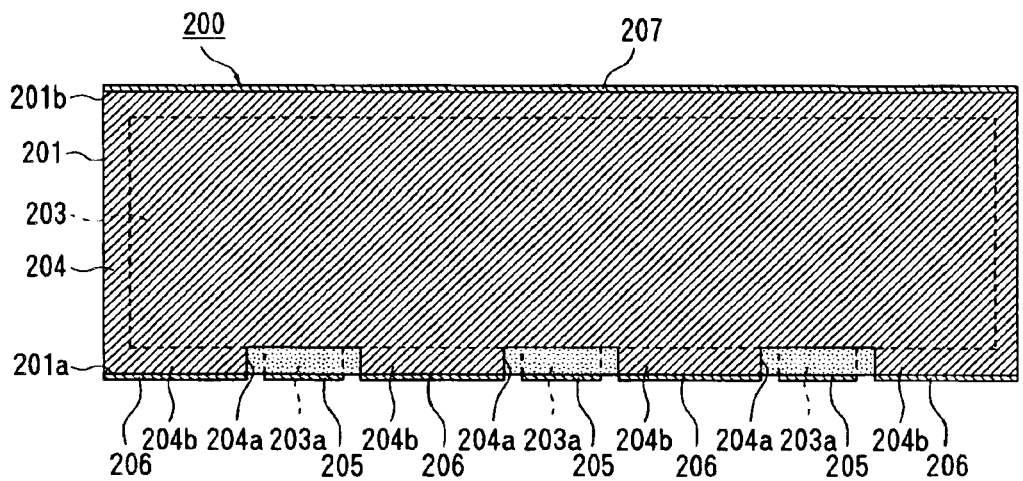
FIG. 35A is a sectional view taken on line c3—c3 in FIG. 34A.
Figure 35B:
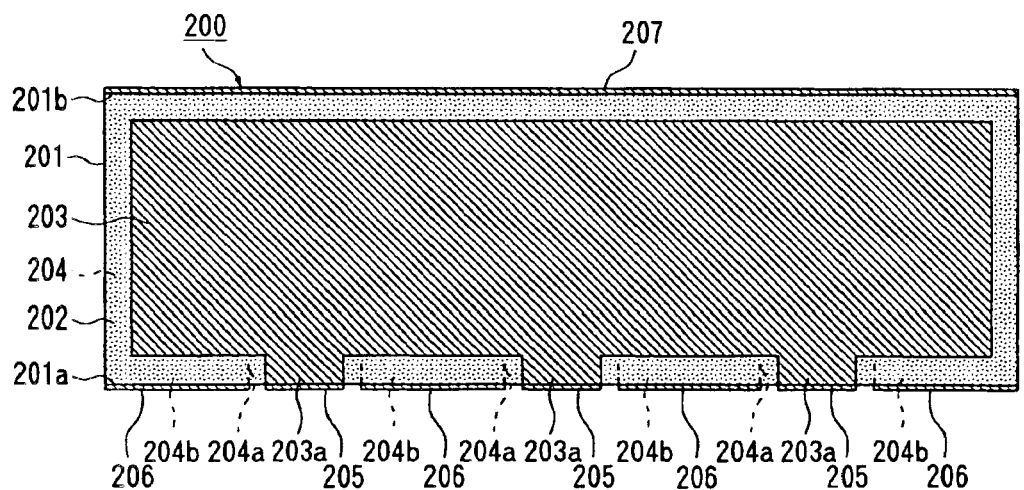
FIG. 35B is a sectional view taken on line c4—c4 in FIG. 34A.

Incidentally, FIG. 33A is a perspective view in view of the top face side of the laminated ceramic capacitor, and FIG. 33B is a perspective view in view of the bottom face side of the laminated ceramic capacitor. FIG. 34A is a sectional view taken on line c1—c1 in FIG. 33A, and FIG. 34B is a sectional view taken on line c2—c2 in FIG. 33A. Furthermore, FIG. 35A is a sectional view taken on line c3—c3 in FIG. 34A, and FIG. 35B is a sectional view taken on line c4—c4 in FIG. 34A.

This laminated ceramic capacitor 200 comprises a laminated chip 201 with a rectangular parallelepiped shape. This laminated chip 201 has the structure that a plurality of first conductor layers 203 (four in the figure), and a plurality of second conductor layers 204 (five in the figure) are arranged so as to alternate through each ceramic layer 202 and to face each other in a crosswise direction.

Each first conductor layer 203 is a rectangle one-size smaller than each second conductor layer 204, and has three lead sections 203a in predetermined width in the center of its lower edge. An end of each lead section 203a is exposed on a lower face 201a of the laminated chip 201. So long as these lead sections 203a are connectable to the below-mentioned first electrodes 205, there is no special limitation in their shapes and formed positions. In addition, an upper edge of each first conductor layer 203 is in an inside position apart from a top face 201b of the laminated chip 201. Furthermore, both side edges of each first conductor layer 203 are in inside positions apart from two side faces in the direction orthogonal to the laminated direction of conductor layers of the laminated chip 201.

Each second conductor layers 204 is the almost same rectangle as a side face in the laminated direction of conductor layers of the laminated chip 201. In addition, each second conductor layer 204 has the almost same depth as the vertical length of the lead sections 203a in its lower edge, and has three notch sections 204a with width larger than that of the lead sections 203a in equal intervals to have a total of four lead sections 204b with predetermined width with sandwiching each notch section 204a. An end of each lead section 204b is exposed on the lower face 201a of the laminated chip 201 without contacting with an edge of each lead section 203a. So long as these lead sections 204b are connectable to the below-mentioned second electrodes 206, there is no special limitation in their shapes and formed positions. In addition, an upper edge of each second conductor layer 204 is exposed on the top face 201b of the laminated chip 201. Furthermore, both side edges of each second conductor layer 204 are exposed on two side faces in the direction orthogonal to the laminated direction of conductor layers of the laminated chip 201. Furthermore, the second conductor layers 204 are located in two side faces in the laminated direction of conductor layers of the laminated chip 201, respectively.

On the bottom face 201a of the laminated chip 201, the first electrodes 205 connected to the edges of the lead sections 203a of respective first conductor layers 203 exposed on this bottom face 201a of the laminated chip 201 are formed zonally in the laminated direction of conductor layers of the laminated chip 201 in the width almost equal to the exposed width of the lead sections 203a.

In addition, on the bottom face 201a of the laminated chip 201, four second electrodes 206 connected to the edges of the lead sections 204a of respective second conductor layers 204 exposed on this bottom face 201a are formed zonally in the laminated direction of conductor layers of the laminated chip 201 in the width almost equal to the exposed width of the lead sections 204a without contacting with the first electrodes 205.

Furthermore, on the top face 201b of the laminated chip 201, the heat radiation conductor 207 connected to the upper edge of each second conductor layer 204 exposed on this top face 201b is formed so as to cover the entire top face 201b. As apparent from the below-mentioned process explanation, this heat radiation conductor 207 is made of a conductive film.

In the above-mentioned laminated ceramic capacitor 200, the edges of the lead sections 203a of each first conductor layer 203 connects to three first electrodes 205 provided on the bottom face 201a of the laminated chip 201, and the edges of the lead sections 204a of each second conductor layer 204 connect to four second electrodes 206 provided on the bottom face 201a of the laminated chip 201. Since the upper edge of each second conductor layer 204 is connected to the heat radiation conductor 207 provided on the top face 201b of the laminated chip 201, it is possible to obtain predetermined electrostatic capacity between the first electrodes 205 and second electrodes 206 which are provided on the bottom face 201a of the laminated chip 201.

In other words, since there is no unnecessary conductor layer between the respective first conductor layers 203 and respective second conductor layers 204 which are adjacent respectively, that is, there are no internal electrodes 5 for heat radiation, different from the internal electrodes 1, between the adjacent internal electrodes 1 respectively like the conventional laminated ceramic capacitors shown in FIGS. 1 to 3. Hence, it is possible to stably secure expected electrostatic capacity between the first electrodes 205 and second electrodes 206 which are provided on the bottom face 201a of the laminated chip 201.

In addition, only the first conductor layers 203 and second conductor layers 204 which play the role of internal electrodes are provided on the laminated chip 201. Hence, it is easily realizable to achieve the large capacity and miniaturization of the laminated ceramic capacitor 200 in comparison with providing the internal electrodes 5, which are dedicated for heat radiation and are separate from the internal electrodes 1, in a ceramic device like the conventional laminated ceramic capacitors shown in FIGS. 1 to 3. That is, when dimensions of the laminated chip 201 is the same as those of a conventional ceramic device, it is possible to increase electrostatic capacity by increasing the number of the first conductor layers 203 and second conductor layers 204. In addition, when they have the same capacity, it is possible to make the dimensions of the laminated chip 201 smaller than those of the conventional ceramic device.

Here, an example of a production method of the above-mentioned laminated ceramic capacitor 200 will be explained with citing FIGS. 36 to 40.

Figure 36:
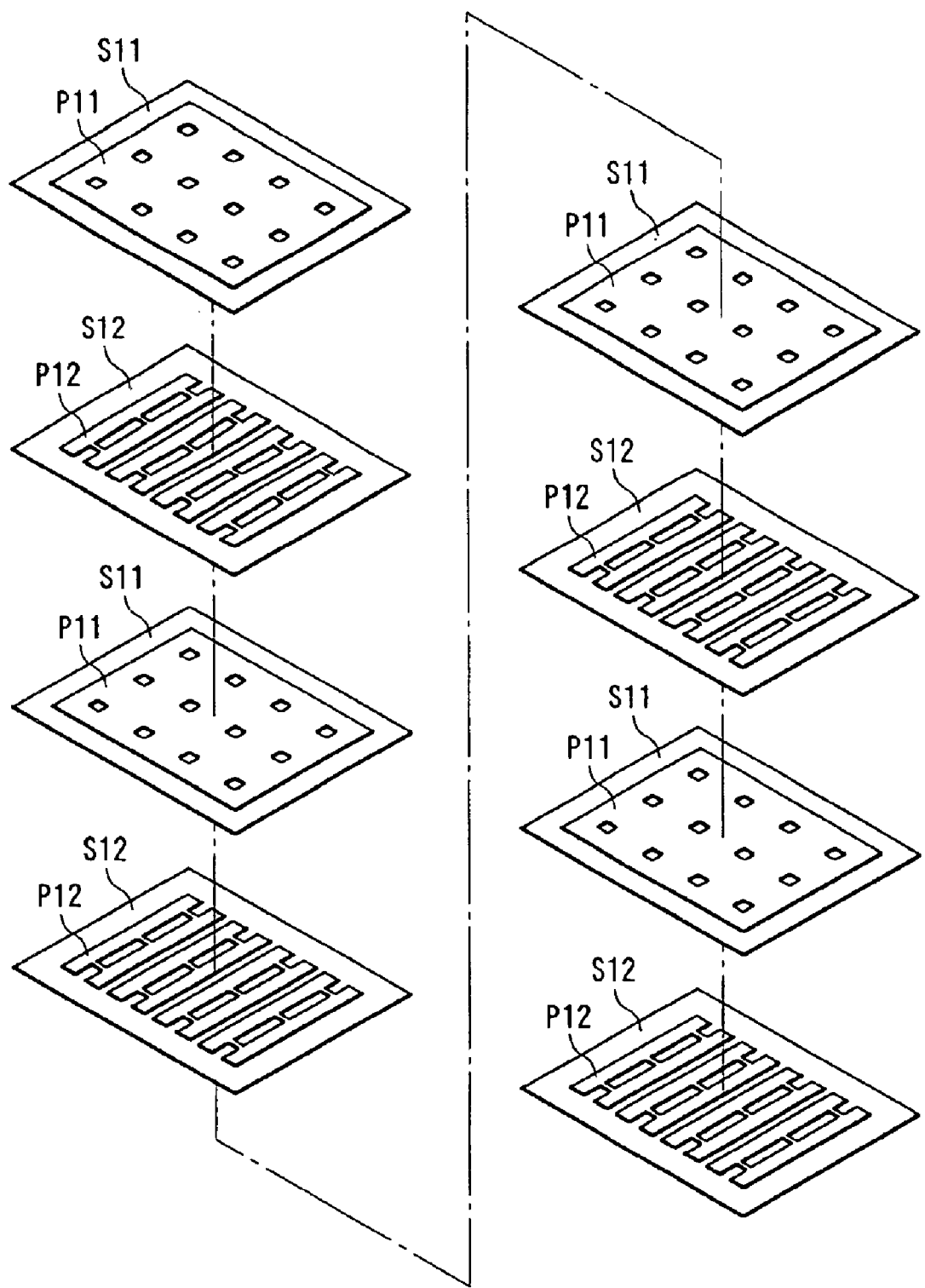
FIGS. 36 to 40 are explanatory diagrams of a production method of the laminated ceramic capacitor shown in FIG. 33A.

On the occasion of production, sheets S11 and S12 shown in FIG. 36 are prepared first. The sheet S11 is produced by printing and drying conductive paste, containing metal powder such as silver and nickel, on a green sheet obtained by coating and drying ceramic slurry, containing dielectric powder such as barium titanate, in predetermined thickness, by using a screen etc., and forming a conductor pattern P11 for the second conductor layers 204. In addition, the sheet S12 is produced by printing and drying conductive paste, containing metal powder such as silver and nickel, on a green sheet obtained by coating and drying ceramic slurry, containing dielectric powder such as barium titanate, in predetermined thickness, by using a screen etc., and forming a conductor pattern P12 for the first conductor layers 203.

Incidentally, although 8-piece sheets S11 and S12 are shown in the figure for the convenience of drawing, the piece count of actual sheets is larger than this.

Figure 37:
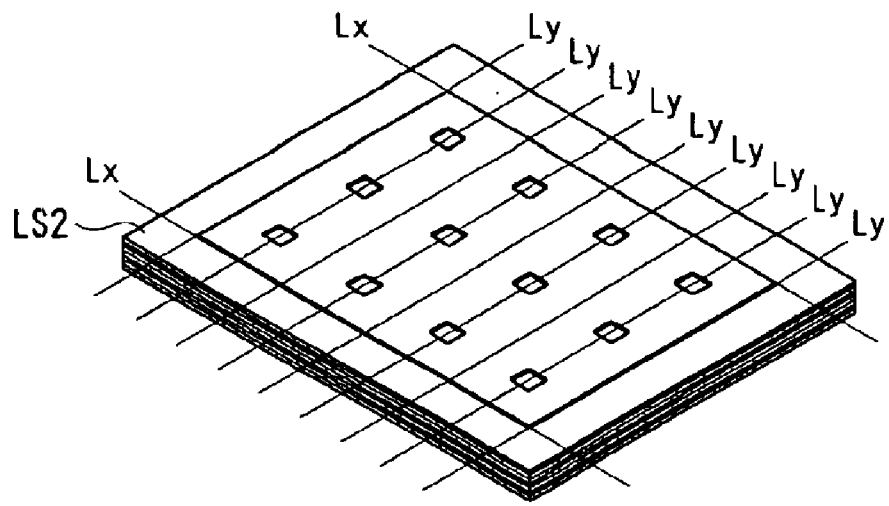

Then, the above-mentioned sheets S11 and S12 are laminated and stuck by pressure in the order shown in FIG. 36, and a laminated sheet LS2 shown in FIG. 37 is obtained.

Figure 38:
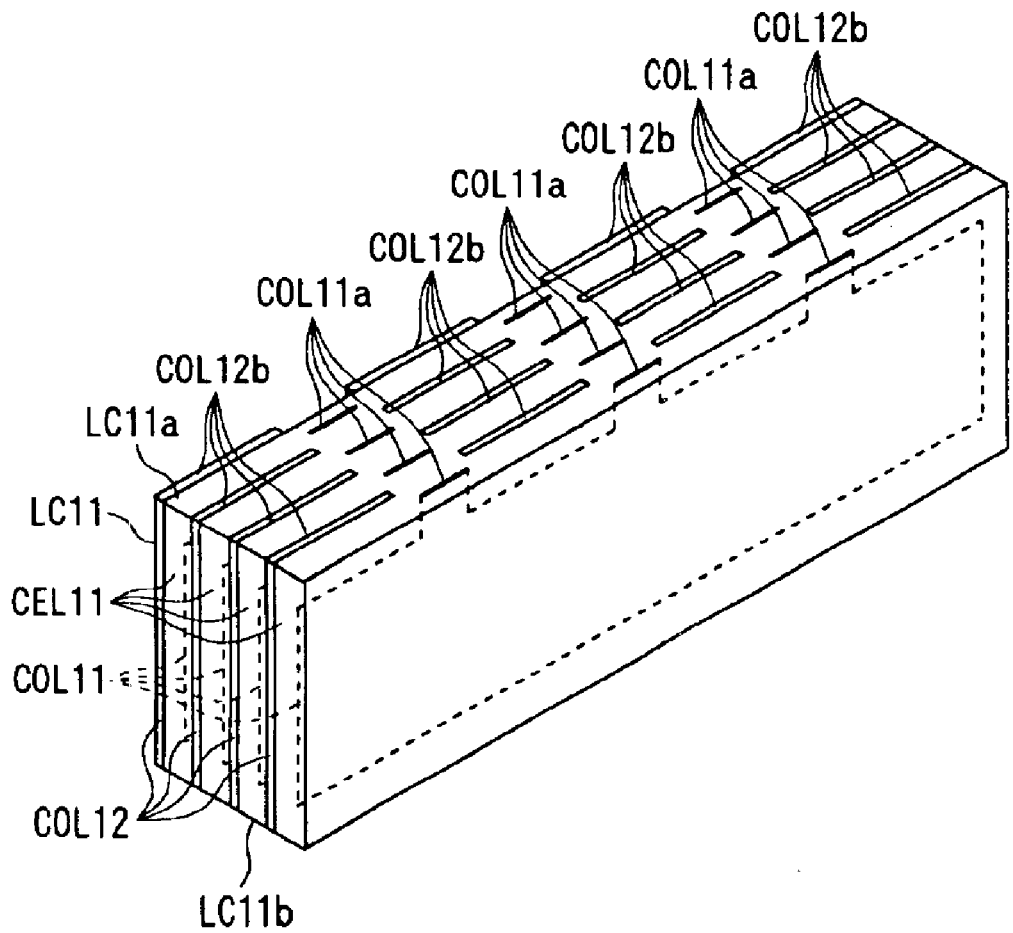

Then, the lamination sheet LS2 is cut along line Lx–Ly shown in FIG. 37, and laminated chips LC11 each shown in FIG. 38 are obtained.

This laminated chip LC11 has the structure that four unbaked conductor layers COL11 for the first conductor layers 203, and four unbaked conductor layers COL12 for the second conductor layers 204 are arranged so as to alternate through each unbaked ceramic layer CEL11 and to face each other in a crosswise direction. An end of a lead section COL11a of each unbaked conductor layer COL11 is exposed on a bottom face LC11a of the laminated chip LC11. In addition, an end of a lead section COL12a of each unbaked conductor layer COL2 is exposed on the bottom face LC11a of the laminated chip LC11. Furthermore, an upper edge of each unbaked conductor layer COL12 is exposed on a top face LC11b of the laminated chip LC11.

Figure 39:
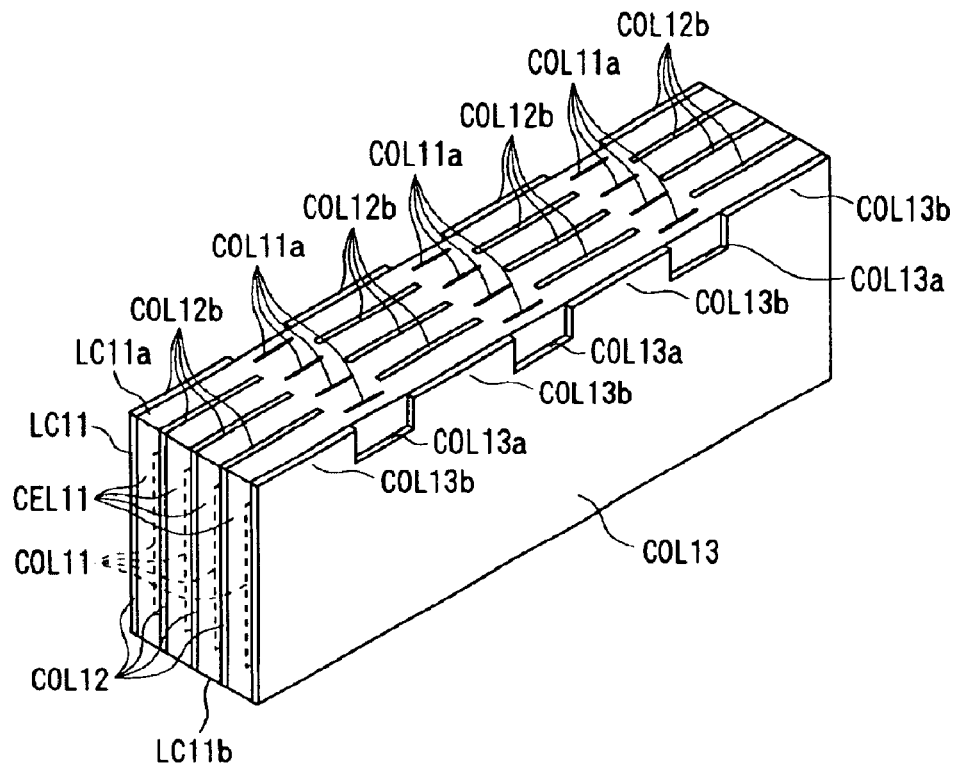

Then, as shown in FIG. 39, an unbaked conductor layer COL13 for a remaining one of the second conductor layers 204 is formed by coating and drying conductive paste, being the same as the above-described one, on a side face (side face where the unbaked ceramic layer exposes) in the laminated direction of conductor layers of the above-mentioned laminated chip LC11 in the same shape as that of the unbaked conductor layer COL12. This unbaked conductor layer COL13 is the same shape as that of the unbaked conductor layer COL12, and has three notch sections COL13a in its lower edge to have four lead sections COL13b in equal intervals with sandwiching each notch section COL13a.

Figure 40:
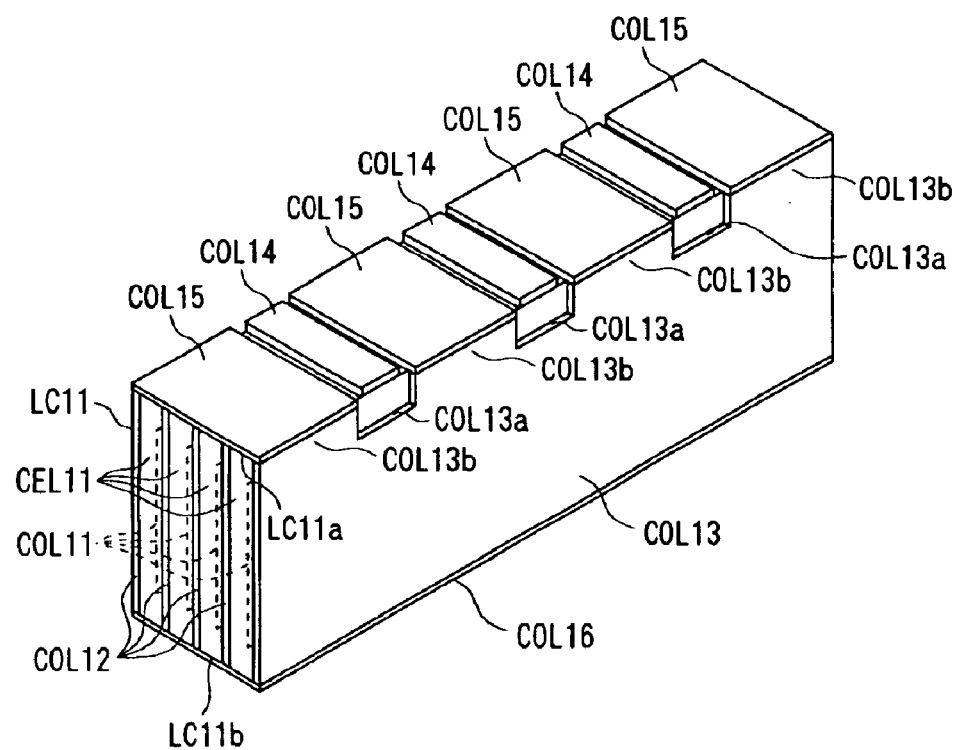

Subsequently, as shown in FIG. 40, three unbaked electrodes COL14 for the first electrodes 205 are formed by zonally coating and drying conductive paste, being the same as the above-described one, on the bottom face of the above-mentioned laminated chip LC11. At the same time, four unbaked electrodes COL15 for the second electrodes 206 are formed by zonally coating and drying conductive paste, being the same as the above-described one, on the bottom face of the above-mentioned laminated chip LC11. Furthermore, an unbaked conductor COL16 for the heat radiation conductor 207 is formed by coating and drying the conductive paste, being the same as the above-described one, on the entire top face of the laminated chip LC11.

Then, many laminated chips LC11 each shown in FIG. 40 are baked in a lump. In this manner, the laminated ceramic capacitor 200 is produced.

In the above-mentioned production method, the unbaked conductor layer COL13 for a remaining one of the second conductor layers 204, the unbaked electrodes COL14 for the first electrodes 205, the unbaked electrodes COL15 for the second electrodes 206, and the unbaked conductor COL16 for the heat radiation conductor 207 are formed on the laminated chip LC11 shown in FIG. 38, and these are simultaneously baked with the laminated chip LC11. Nevertheless, it is also acceptable to bake only the laminated chip LC11 shown in the FIG. 38, to sequentially form the unbaked conductor layers COL13, unbaked electrodes COL14, unbaked electrodes COL15, and the unbaked conductor COL16 on the laminated chip LC11 after baking, and to perform baking treatment.

In addition, in the above-mentioned production method, the remaining one of the second conductor layers 204, first electrodes 205, second electrodes 206, and heat radiation conductor 207 are formed by a thick film forming method by paste coating and baking. Nevertheless, it is also acceptable to form at least one of these by a thin film forming method such as electrolytic plating or sputtering.

Figure 41:
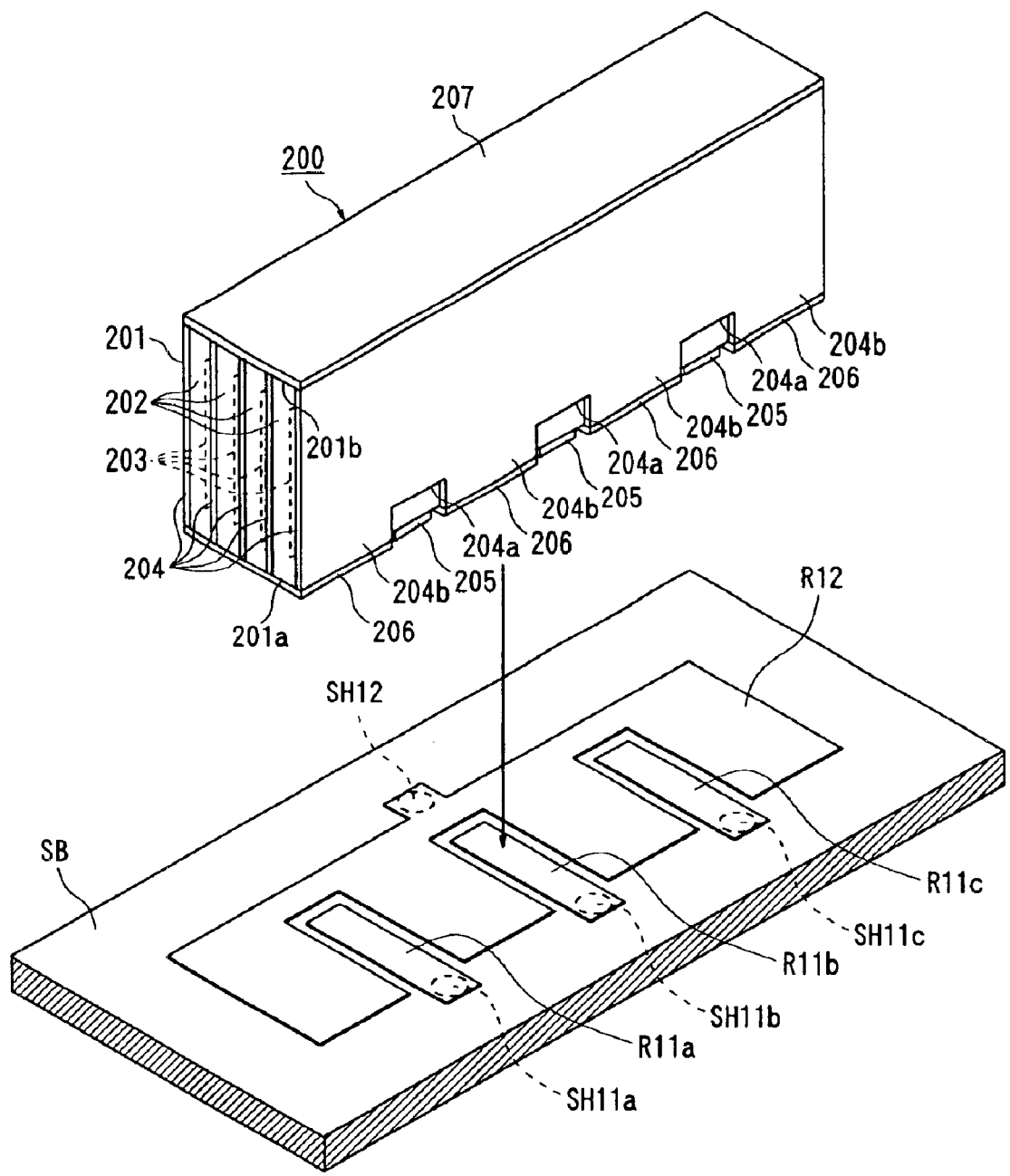
FIG. 41 is an explanatory diagram of a mounting method of the laminated ceramic capacitor shown in FIG. 33A.

The above-mentioned laminated ceramic capacitor 200, as shown in FIG. 41, can be mounted so that the bottom face of the laminated chip 201 may face the mounting surface of the substrate on the substrate SB having lands R11a to R11C, and R12 respectively corresponding to the first electrodes 205 and second electrodes 206, three pieces of first electrodes 205 may connects to the lands R11a to R11c, and four pieces of second electrodes 206 may connect to the land R12.

Incidentally, in the substrate SB shown in FIG. 41, one group of the lands R11a to R11c, and R12 is a positive electrode group, and another group becomes a ground electrode group. The wirings to the lands R11a to R11c are routed through through-holes SH11a to SH11c to the back side of the substrate, and the wiring of the land R12 used as another side is routed through the through hole SH12 in the back side of the substrate.

In the above-mentioned laminated ceramic capacitor 200, and an assembly (mounted structure) where the above-mentioned laminated ceramic capacitor 200 is mounted on the substrate SB, when heat is generated in each first conductor layer 203 and each second conductor layer 204 at the time of voltage application to the laminated ceramic capacitor 200 after mounting, and, when the heat of a heat-generating device such as CPU, mounted on the mount substrate SB, is transferred to each first conductor layer 203 and each second conductor layer 204 from the substrate SB and lands R11a to R 11c, and R12 through the first electrodes 205 and second electrodes 206, the heat of each second conductor layer 204 is directly transferred from each second conductor layer 204 to the heat radiation conductor 207, and is radiated outside from the heat radiation conductor 207. In addition, the heat of each first conductor layer 203 is transferred to the heat radiation conductor 207 indirectly through the ceramic layers 202 and second conductor layers 204, and is radiated similarly. That is, it is possible to control temperature rise by radiating the heat of the capacitor itself outside effectively by transferring the heat of the respective second conductor layers 204 between the respective first conductor layers 203 and respective second conductor layers 204 to the heat radiation conductor 207 directly and efficiently.

In addition, since the heat radiation conductor 207 is provided so as to cover the entire top face of the laminated chip 201, it is possible to perform the above-mentioned heat radiation more effectively by securing an area for radiating heat outside.

Furthermore, the second conductor layers 204 are exposed on two side faces in the laminated direction of conductor layers of the laminated chip 201. Furthermore, both side edges of each second conductor layer 204 are exposed on two side faces in the direction orthogonal to the laminated direction of conductor layers of the laminated chip 201. Hence, it is possible to promote the above-mentioned heat radiating action by making these exposed portions act the same operation as that of the heat radiation conductor.

In addition, the above-mentioned laminated ceramic capacitor 200 comprises the heat radiation conductor 207 made of a conductive film. Nevertheless, as shown in FIG. 14A, it is also good to make a conductive plate (heat sink), which is made of high heat conductivity metal such as aluminum and is connected to the conductive film (207), a heat radiation conductor.

It is also possible to use as this conductive plate an object having a concavity which accepts a part of the laminated chip 11 as shown in FIG. 14B, and an object having a plurality of fins as shown in FIG. 14C besides a plate-like object. In addition, when providing a conductive plate so as to be connected to the upper edge of each second conductor layer 204 as explained in FIG. 14D, it is also possible to make the structure that the above-mentioned conductive film (207) is eliminated.

In addition, when two or more laminated ceramic capacitors 200 are arranged and mounted on a substrate, it is also good to connect a common conductive plate (heat sink), which is made of high heat conductivity metal such as aluminum, to the conductive films (207) of a plurality of laminated ceramic capacitors 200 as explained in FIG. 15. An object having a shape corresponding to an arrangement form of two or more laminated ceramic capacitors 200 arranged and mounted on a substrate is used for this common conductive plate.

It is also possible to use as this conductive plate an object having a plurality of concavities which accept a part of the laminated chip 201 as explained in FIG. 16, and an object having a plurality of fins as explained in FIG. 17 besides a plate-like object. In addition, when providing a conductive plate so as to be connected to the upper edge of each second conductor layer 204 of a plurality of laminated ceramic capacitors 200 as explained in FIG. 18, it is also possible to use a laminated ceramic capacitor having the structure that the above-mentioned conductive films (207) are eliminated.

In addition, when two or more laminated ceramic capacitors 200 are arranged and mounted on a substrate, it is possible to simply performing the mounting on a substrate by producing beforehand the capacitor module shown in FIG. 19, that is, a module constituted by providing a plurality of laminated ceramic capacitors 200 on a face of a conductive plate (heat sink), made of high heat conductivity metal such as aluminum, in predetermined arrangement so that the conductive films (207) may connect to each other. A heat radiating action after mounting is as explained above.

It is also possible to use as this conductive plate an object having a plurality of concavities which accept a part of the laminated chip 201 as explained in FIG. 20, and an object having a plurality of fins on an opposite face as explained in FIG. 21 besides a plate-like object. In addition, when providing a plurality of laminated ceramic capacitors 200 so that the upper edge of each second conductor layer 204 may connect to a face of the conductive plate as explained in FIG. 22, it is also possible to use a laminated ceramic capacitor having the structure that the above-mentioned conductive films (207) are eliminated.

Figure 42:
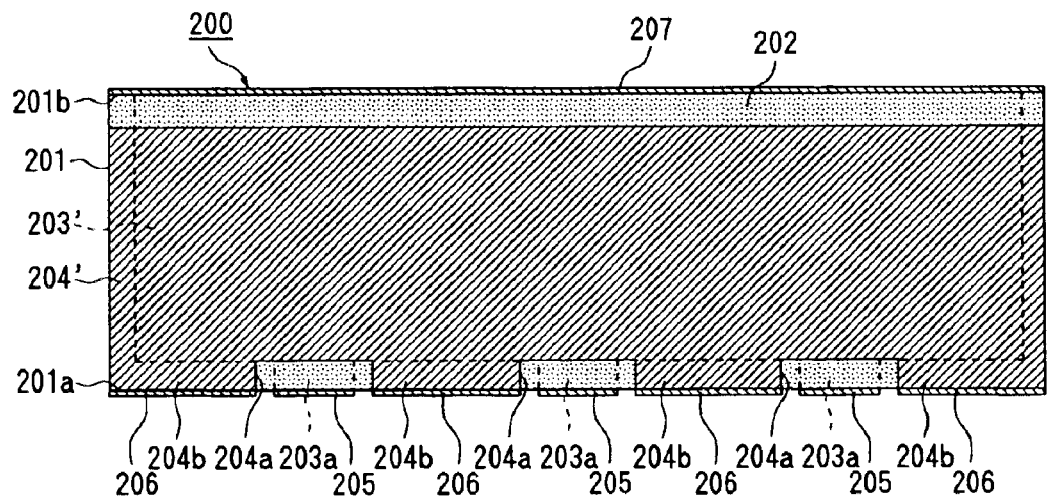
FIG. 42 is a vertical sectional diagram showing a modified example of the laminated ceramic capacitor shown in FIG. 33A.
Figure 43:
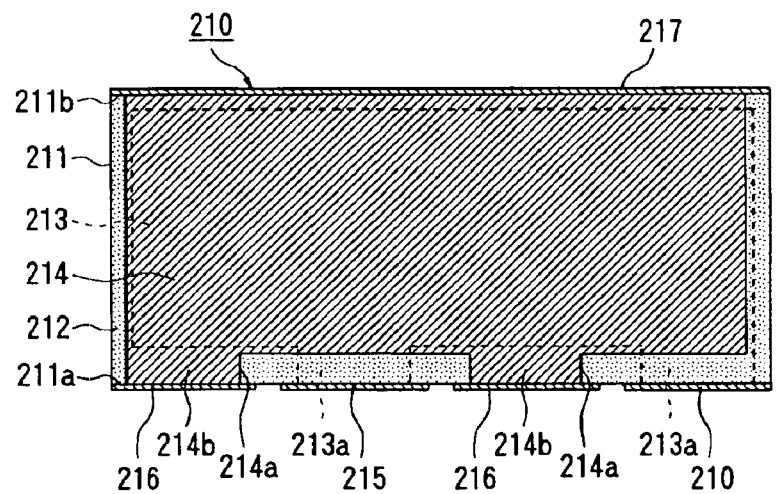
FIG. 43 is a vertical sectional view showing another modified example of the laminated ceramic capacitor shown in FIG. 33A.

Furthermore, in the above-described laminated ceramic capacitor 200, each upper edge of the second conductor layers 204 is exposed on the top face 201b of the laminated chip 201 and this is connected to the heat radiation conductor 207. Nevertheless, as shown in FIG. 42, when each upper edge of second conductor layers 204' is located in the inside apart from the top face 201b of the laminated chip 201, each upper edge of first conductor layers 203' is exposed on the top face 201b of the laminated chip 201, and this is connected to the heat radiation conductor 207, it is possible to obtain the same radiating effects as the above-described ones.

In addition, in the above-mentioned laminated ceramic capacitor 200, the number of the first electrodes 205 differs from the number of the second electrodes 216. Nevertheless, the laminated ceramic capacitor 200 may also have the same numbers (two pieces) of first electrodes 215 and second electrodes 216 like the laminated ceramic capacitor 210 shown in FIG. 43.

Moreover, in the above-mentioned laminated ceramic capacitor 200, it is possible to suitably adopt the structure of the third to tenth embodiments of the laminated ceramic capacitor, which is explained with citing FIGS. 25 to 32, similarly to the laminated ceramic capacitor 10 shown in FIGS. 4 to 7.

The preferable aspects mentioned in this specification are for purpose of exemplification only and are not intended as definitions of the limits. The scope of the present invention is shown by the appended claims and all the modified examples that fall into the meaning of these claims are included in the present invention.

What is claimed is:

1. A laminated ceramic capacitor comprising:
   a rectangular parallelepiped laminated chip having a plurality of first conductor layers and a plurality of second conductor layers, the first conductor layers and the second conductor layers being alternately arranged to face each other through a ceramic layer;
   at least one first electrode which is provided on one face of the laminated chip and conducts with the first conductor layers;
   at least one second electrode which is provided in the one face of the laminated chip without contacting with the first electrode, and conducts with the second conductor layers; and
   at least one heat radiation conductor which is provided on at least one face different from the one face of the laminated chip, and conducts with at least one of the first conductor layers and the second conductor layers.

2. The laminated ceramic capacitor according to claim 1, wherein the heat radiation conductor consists of a conductive film formed on at least one face different from the one face of the laminated chip.

3. The laminated ceramic capacitor according to claim 1, wherein the heat radiation conductor consists of a conductive plate provided on at least one face different from the one face of the laminated chip.

4. The laminated ceramic capacitor according to claim 3, wherein the conductive plate has a concavity which accepts a part of the laminated chip.

5. The laminated ceramic capacitor according to claim 3, wherein the conductive plate has a plurality of fins.

6. The laminated ceramic capacitor according to claim 1, wherein the heat radiation conductor consists of a conductive film formed on at least one face different from the one face of the laminated chip, and of a conductive plate connected to the conductive film.

7. The laminated ceramic capacitor according to claim 6, wherein the conductive plate has a concavity which accepts a part of the laminated chip.

8. The laminated ceramic capacitor according to claim 6, wherein the conductive plate has a plurality of fins.

9. The laminated ceramic capacitor according to claim 1, wherein the heat radiation conductor is provided on a face opposite to the one face of the laminated chip.

10. The laminated ceramic capacitor according to claim 1, wherein the heat radiation conductor is provided on at least one face adjacent to the one face of the laminated chip.

11. The laminated ceramic capacitor according to claim 1, wherein the heat radiation conductor is provided on a face opposite to the one face of the laminated chip and at least one face adjacent to this face.

12. The laminated ceramic capacitor according to claim 1, wherein the number of the heat radiation conductors is one, and one of the first conductor layers and the second conductor layers conduct with the heat radiation conductor.

13. The laminated ceramic capacitor according to claim 1, wherein the number of the heat radiation conductors is two, the first conductor layers conduct with one of the heat radiation conductors, and the second conductor layers conduct with another one of the heat radiation conductors.

14. The laminated ceramic capacitor according to claim 1, wherein at least one of the first electrode and the second electrode has a rounding portion which extends at least one face adjacent to the one face.

15. A mounted structure comprising:
    at least one laminated ceramic capacitor mounted on a substrate so that a first electrode of the laminated ceramic capacitor is connected to a first land on a mounting surface of the substrate and a second electrode of the laminated ceramic capacitor is connected to a second land on the mounting surface of the substrate,
    wherein the laminated capacitor includes,
    a rectangular parallelepiped laminated chip having a plurality of first conductor layers and a plurality of second conductor layers, the first conductor layers and the second conductor layers being alternately arranged to face each other through a ceramic layer;
    at least one first electrode which is provided on one face of the laminated chip and conducts with the first conductor layers;
    at least one second electrode which is provided in the one face of the laminated chip without contacting with the first electrode, and conducts with the second conductor layers; and
    at least one heat radiation conductor which is provided on at least one face different from the one face of the laminated chip, and conducts with at least one of the first conductor layers and the second conductor layers.

16. The mounted structure according to claim 15, wherein the heat radiation conductor consists of a conductive film formed on at least one face different from the one face of the laminated chip.

17. The mounted structure according to claim 15, wherein the heat radiation conductor consists of a conductive plate provided on at least one face different from the one face of the laminated chip.

18. The mounted structure according to claim 17, wherein the conductive plate has a concavity which accepts a part of the laminated chip.

19. The mounted structure according to claim 17, wherein the conductive plate has a plurality of fins.

20. The mounted structure according to claim 17, wherein plural the laminated capacitors are mounted on the substrate, and the laminated capacitors hold the conductive plate in common.

21. The mounted structure according to claim 15, wherein the heat radiation conductor consists of a conductive film formed on at least one face different from the one face of the laminated chip, and of a conductive plate connected to the conductive film.

22. The mounted structure according to claim 21, wherein the conductive plate has a concavity which accepts a part of the laminated chip.

23. The mounted structure according to claim 21, wherein the conductive plate has a plurality of fins.

24. The mounted structure according to claim 21, wherein plural the laminated capacitors are mounted on the substrate, and the laminated capacitors hold the conductive plate in common.

25. A capacitor module comprising:

a conductive plate with a predetermined shape; and a plurality of laminated ceramic capacitors including, a rectangular parallelepiped laminated chip having a plurality of first conductor layers and a plurality of second conductor layers, the first conductor layers and the second conductor layers being alternately arranged to face each other through a ceramic layer; at least one first electrode which is provided on one face of the laminated chip and conducts with the first conductor layers; at least one second electrode which is provided in the one face of the laminated chip without contacting with the first electrode, and conducts with the second conductor layers; and at least one heat radiation conductor which is provided on at least one face different from the one face of the laminated chip, and conducts with at least one of the first conductor layers and the second conductor layers, wherein the capacitor module is constituted by providing each laminated ceramic capacitor on the conductive plate in predetermined arrangement so that a face different from the one face of each laminated chip faces the conductive plate, and at least one of the first conductor layers and second conductor layers conduct with the conductive plate.

26. The capacitor module according to claim 25, wherein the conductive plate has a plurality of concavities that respectively accept a part of the laminated chip of each the laminated ceramic capacitor.

27. The capacitor module according to claim 25, wherein the conductive plate has a plurality of fins.

* * * * *